US012528016B2

(12) United States Patent
Zhang

(10) Patent No.: US 12,528,016 B2
(45) Date of Patent: Jan. 20, 2026

(54) ARTIFICIAL INTELLIGENCE OBJECT CONTROL METHOD AND APPARATUS, DEVICE, AND STORAGE MEDIUM

(71) Applicant: Tencent Technology (Shenzhen) Company Limited, Shenzhen (CN)

(72) Inventor: Shubao Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 296 days.

(21) Appl. No.: 18/135,914

(22) Filed: Apr. 18, 2023

(65) Prior Publication Data

US 2023/0293995 A1 Sep. 21, 2023

Related U.S. Application Data

(63) Continuation of application No. PCT/CN2022/106330, filed on Jul. 18, 2022.

(30) Foreign Application Priority Data

Aug. 23, 2021 (CN) .......................... 202110969023.3

(51) Int. Cl.
A63F 13/56 (2014.01)
G06F 3/04815 (2022.01)
(Continued)

(52) U.S. Cl.
CPC .......... A63F 13/56 (2014.09); G06F 3/04815 (2013.01); G06F 3/04842 (2013.01);
(Continued)

(58) Field of Classification Search
None
See application file for complete search history.

(56) References Cited

U.S. PATENT DOCUMENTS 9,827,492 B2 * 11/2017 Yamada .................. A63F 13/42
10,864,446 B2 * 12/2020 Borovikov .............. A63F 13/77
(Continued)

FOREIGN PATENT DOCUMENTS

CN 110310350 A 10/2019
CN 111282279 A 6/2020
(Continued)

OTHER PUBLICATIONS

Tencent Technology, WO, PCT/CN2022/106330, Oct. 19, 2022, 5 pgs.

(Continued)

Primary Examiner — Sunit Pandya
(74) Attorney, Agent, or Firm — Morgan, Lewis & Bockius LLP

(57) ABSTRACT

Embodiments of this application disclose a method of controlling an artificial intelligence object performed by a terminal. The method includes: displaying, by the terminal, a virtual scene interface, the virtual scene interface including a virtual object controlled by the terminal; detecting, by the terminal, a control instruction via the virtual scene interface, the control instruction instructing an artificial intelligence object in an ally camp of the controlled virtual object to perform a target operation; and controlling, by the terminal based on the control instruction, the artificial intelligence object to perform the target operation.

18 Claims, 19 Drawing Sheets

(51) Int. Cl.
*G06F 3/04842* (2022.01)
*G06F 3/0486* (2013.01)
*G06F 3/0488* (2022.01)
*G06T 17/00* (2006.01)

(52) U.S. Cl.
CPC .......... *G06F 3/0486* (2013.01); *G06F 3/0488* (2013.01); *G06T 17/00* (2013.01)

(56) References Cited

U.S. PATENT DOCUMENTS

| | | | | |
|---|---|---|---|---|
| 11,471,764 | B2* | 10/2022 | Kolen | A63F 13/355 |
| 2021/0158141 | A1 | 5/2021 | Taylor et al. | |
| 2022/0274023 | A1* | 9/2022 | Vange | A63F 13/56 |
| 2023/0173396 | A1* | 6/2023 | Asai | A63F 13/573 463/3 |
| 2023/0219000 | A1* | 7/2023 | Dang | G06F 3/0482 463/31 |
| 2023/0256338 | A1* | 8/2023 | Cai | A63F 13/537 463/32 |
| 2023/0256341 | A1* | 8/2023 | Cai | G06T 19/20 |

FOREIGN PATENT DOCUMENTS

| | | |
|---|---|---|
| CN | 111450533 A | 7/2020 |
| CN | 111514585 A | 8/2020 |
| CN | 112973117 A | 6/2021 |
| CN | 113254872 A | 8/2021 |
| CN | 114272599 A | 4/2022 |
| WO | WO 2020252400 A1 | 12/2020 |

OTHER PUBLICATIONS

Tencent Technology, IPRP, PCT/CN2022/106330, Feb. 27, 2024, 6 pgs.
Deep Learning and Advanced Intelligent Decision Making, "Tencent's "Juewu" Paper Discloses Technical Details", Mar. 25, 2020, 5 pgs., Retrieved from the Internet: https://aljishu.com/a/1060000000100723.
Tencent Technology, ISR, PCT/CN2022/106330, Oct. 19, 2022, 3 pgs.
Tieba.Baidu.com, "How to Control the Actions of AI Teammates?", Apr. 2018, Retrieved from the Internet: https://tieba.baidu.com/p/5634743473.
Zhuanlan.Zhihu.com, "Playing MOBA Games Using Deep Reinforcement Learning", Dec. 2020, Retrieved from the Internet: https://zhuanlan.zhihu.com/p/378789632.

* cited by examiner

ARTIFICIAL INTELLIGENCE OBJECT CONTROL METHOD AND APPARATUS, DEVICE, AND STORAGE MEDIUM

CROSS-REFERENCE TO RELATED APPLICATIONS

This application is a continuation application of PCT Patent Application No. PCT/CN2022/106330, entitled "ARTIFICIAL INTELLIGENCE OBJECT CONTROL METHOD AND APPARATUS, DEVICE, AND STORAGE MEDIUM" filed on Jul. 18, 2022, which claims priority to Chinese Patent Application No. 202110969023.3, entitled "ARTIFICIAL INTELLIGENCE OBJECT CONTROL METHOD AND APPARATUS, DEVICE, AND STORAGE MEDIUM" filed on Aug. 23, 2021, all of which is incorporated herein by reference in its entirety.

FIELD OF THE TECHNOLOGY

The embodiments of this application relate to the technical field of artificial intelligence, in particular to an artificial intelligence object control method and apparatus, a device, and a storage medium.

BACKGROUND OF THE DISCLOSURE

With the development of artificial intelligence (AI) technology, artificial intelligence objects gradually emerge in the fields of games, medical treatment, etc. The artificial intelligence objects are objects manipulated based on a neural network model, rather than by users based on a terminal.

SUMMARY

Embodiments of this application provide an artificial intelligence object control method and apparatus, a device, and a storage medium, extending the functions of an artificial intelligence object and providing an artificial intelligence object with controllable operations. The technical solutions are as follows:

In one aspect, a method of controlling an artificial intelligence object is performed by a terminal. The method includes:

displaying, by a terminal, a virtual scene interface, the virtual scene interface including a virtual object controlled by the terminal;

detecting, by the terminal, a control instruction via the virtual scene interface, the control instruction instructing an artificial intelligence object in an ally camp of the controlled virtual object to perform a target operation; and controlling, by the terminal based on the control instruction, the artificial intelligence object to perform the target operation.

In another aspect, an artificial intelligence object control method is provided. The method includes:

receiving, by a server, a control instruction transmitted by a terminal, the control instruction being used for instructing an artificial intelligence object to perform a target operation; and controlling, by the server based on the control instruction, the artificial intelligence object to perform the target operation, the artificial intelligence object belonging to an ally camp of a virtual object controlled by the terminal.

In yet another aspect, a terminal is provided. The terminal includes a processor and a memory, the memory having at least one computer program stored therein, the at least one computer program being loaded and executed by the processor and causing the terminal to implement the operations performed by the artificial intelligence object control method described as the above aspect.

In yet another aspect, a server is provided. The server includes a processor and a memory, the memory having at least one computer program stored therein, the at least one computer program being loaded and executed by the processor to implement the operations performed by the artificial intelligence object control method described as the above aspect.

In yet another aspect, a non-transitory computer-readable storage medium is provided. The computer-readable storage medium has at least one computer program stored therein, the at least one computer program being loaded and executed by a processor of a terminal and causing the terminal to implement the operations performed by the artificial intelligence object control method described as the above aspect.

In yet another aspect, a computer program product or computer program is provided. The computer program product or computer program includes a computer program code stored in a computer-readable storage medium, a processor of a computer device reading the computer program code from the computer-readable storage medium, the processor executing the computer program code to cause the computer device to implement the operations performed by the artificial intelligence object control method described as the above aspect.

According to the embodiments of this application, the function of the artificial intelligence object is extended, and the artificial intelligence object with controllable operations is provided. A user can control the artificial intelligence object belonging to the same camp as the controlled virtual object to perform the target operation only by transmitting the control instruction, achieving control over the artificial intelligence object. Therefore, collaboration between human and the artificial intelligence object is achieved.

DESCRIPTION OF EMBODIMENTS

Figure 1:
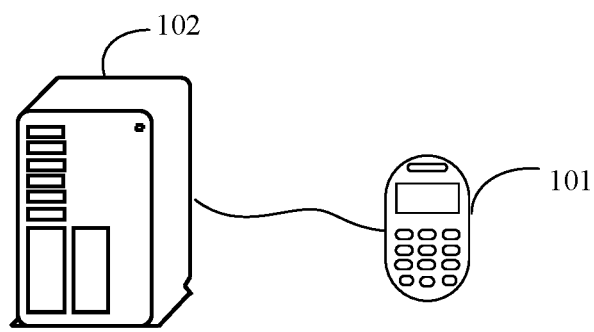
FIG. 1 is a schematic diagram of an implementation environment according to an embodiment of this application.

A virtual scene involved in this application is used for simulating a three-dimensional virtual space, where the three-dimensional virtual space is an open space. The virtual scene is used for simulating a real environment in reality, for example, the virtual scene includes sky, land, sea, etc., and the land includes a desert, a city and other environmental elements. Of course, the virtual scene may also include virtual objects such as buildings, vehicles, props like weapons needed by virtual objects in the virtual scene to arm themselves or combat with other virtual objects. The virtual scene may also be used for simulating a real environment in different weather, such as sunny, rainy, foggy or dark.

A user controls a virtual object to move in the virtual scene. The virtual object is a virtual image in the virtual scene for representing the user, and the virtual image is any form, for example, a person, an animal, and the like, which is not limited in this application. Taking a shooting game as an example, the user controls the virtual object to freely fall, glide or open a parachute to fall in the sky of the virtual scene, or to run, jump, crawl, bend and go forward on the land, or to swim, float or dive in the sea. Of course, the user may also control the virtual object to move in the virtual scene by a vehicle. The user may also control the virtual object to enter and exit a building in the virtual scene to find and pick up a virtual object (such as a prop like a weapon) in the virtual scene, so as to combat with other virtual objects with the picked-up virtual object. For example, the virtual object may be clothing, a helmet, bulletproof clothes, a medical article, a cold weapon or a hot weapon, and the like and may also be virtual objects left after other virtual objects are knocked out. The above-mentioned scene is merely exemplified herein, which is not specifically limited by the embodiments of this application.

This embodiment of this application takes an electronic game scene as an example. A user performs an operation on the terminal in advance, and after detecting out the operation of the user, the terminal downloads a game configuration file of the electronic game, the game configuration file including an application of the electronic game, interface display data or virtual scene data, etc., so that when the user logs into the electronic game on the terminal, the game configuration file is called to render and display an electronic game interface. The user performs a touch operation on the terminal, and after detecting out the touch operation, the terminal determines game data corresponding to the touch operation, and renders and displays the game data. The game data includes virtual scene data, behavior data of virtual objects in the virtual scene, etc.

When the terminal renders and displays the virtual scene, the virtual scene is displayed on a full screen. The terminal may also independently display a global map in a first preset region of the current display interface while the virtual scene is displayed in the current display interface. In practical applications, the terminal may also display the global map only when detecting out a click operation on a preset button. The global map is used for displaying a thumbnail of the virtual scene. The thumbnail is used for describing geographical features, such as a terrain, a physiognomy and a geographical position, corresponding to the virtual scene. Of course, the terminal may also display a thumbnail of a virtual scene within a certain distance around a current virtual object in the current display interface, and when a click operation on the global map is detected out, a thumbnail of an overall virtual scene is displayed in a second preset region of the current display interface of the terminal, so that a user may check not only the virtual scene around, but also the overall virtual scene. The terminal may also zoom and display the complete thumbnail when detecting out a zoom operation on the complete thumbnail. The specific display positions and shapes of the first preset region and the second preset region may be set according to operation habits of the user. For example, in order not to cause excessive occlusion on the virtual scene, the first preset region may be a rectangular region in the upper right corner, lower right corner, upper left corner or lower left corner of the current display interface, etc.; and the second preset region may be a square region to the right or left of the current display interface. Of course, the first preset region and the second preset region may also be circular region or regions in other shapes, and the specific display positions and shapes of the preset regions are not limited in the embodiments of this application.

In order to facilitate the understanding of the embodiments of this application, keywords involved in the embodiments of this application are explained first:

Multiplayer online battle arena (MOBA) game: A game that provides a plurality of strongholds in the virtual scene and allows users in different camps to control virtual objects to combat with each other, occupy strongholds or destroy strongholds of hostile camps in the virtual scene. For example, in the MOBA game, users the grouped into at least two hostile camps, and different virtual teams belonging to the at least two hostile camps occupy respective map areas and compete with a certain winning condition as a goal. The winning conditions include, but are not limited to: at least one of occupying strongholds or destroying strongholds of the hostile camps, killing the virtual objects of the hostile camps, ensuring own survival in the specified scene and within the specified time, seizing certain resources, and outscoring the opponent within the specified time. For example, in a mobile MOBA game, users are grouped into two hostile camps, the virtual objects controlled by the users are dispersed in the virtual scene to compete against each other, with destroying or occupying all strongholds of the enemy as a winning condition.

In the MOBA game, a user controls a virtual object to release a skill so as to combat with other virtual objects, for example, skill types of the skill may include an attack skill, a defense skill, a healing skill, a complementary skill, a killing skill, etc. Each of the virtual objects may have one or more fixed skills respectively, and different virtual objects generally have different skills which may produce different effects. For example, if the virtual object releases the attack skill that hits the hostile virtual object, a certain damage may be caused to the hostile virtual object, which is usually manifested as deducting part of virtual hit point of the hostile virtual object. For another example, if the virtual object releases the healing skill that hits a friendly virtual object, a certain healing effect may be produced for the friendly virtual object, which is usually manifested as restoring part of virtual hit points of the friendly virtual object. Other skills may produce corresponding effects and will not be enumerated herein.

Human-AI collaboration: Human and AI collaborate (collaborate together to accomplish a certain task) and interact (communicate signals such as text to each other) in the same environment. Such AI is generally referred to as collaborative AI, which also emphasizes the collaboration and interactivity of AI agents compared with the automation nature of traditional AI agents.

Action-controllable AI agent: An AI agent of which an action policy may be changed by a control instruction. Some AI agents usually only have the automation nature, that is, the agents may make decisions and act autonomously. However, their actions may not be controlled, that is, actions of the AI agents may not be changed by an externally initiated control instruction. In the scenario of human-AI collaboration, besides the automation nature, AI agents also have collaboration and interactivity, that is, the agents may perform collaborative interactions with other agents. The action-controllable AI agents may meet the needs of such collaborative interactions, and actions thereof may be changed by the external control instruction for accomplishing the collaborative interactions.

FIG. 1 is a schematic structural diagram of an implementation environment according to an embodiment of this application. As shown in FIG. 1, the implementation environment includes a terminal 101 and a server 102. In some embodiments, the terminal 101 is a smart phone, a tablet computer, a notebook computer, a desktop computer, a smart speaker, a smart television, a smart watch, etc., but is not limited thereto. In some embodiments, the server 102 is an independent physical server, or the server 102 is a server cluster or distributed system formed by a plurality of physical servers, or the server 102 is a cloud server providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. The terminal 101 and the server 102 are directly or indirectly connected via wired or wireless communication, which is not limited in this application.

The server 102 provides the terminal 101 with a virtual scene, the terminal 101 may display virtual objects, virtual props, etc. through the virtual scene provided by the server 102. In addition, the terminal 101 provides an operating environment for a user to detect an operation performed by the user. The server 102 may perform background processing for the operation detected by the terminal, providing background support for the terminal 101.

In some embodiments, the terminal 101 is equipped with a game application served by the server 102, and the terminal 101 may interact with the server 102 via the game application. The terminal 101 runs the game application, provides the user with an operating environment for the game application, and may detect an operation of the user on the game application and transmit an operation instruction to the server 102; and the server 102 responds based on the operation instruction, and returns a response result to the terminal 101 to be displayed by the terminal 101, thus realizing human-computer interaction.

A method according to an embodiment of this application may be used in various scenarios.

For example, in a competitive game scene:

the terminal runs a competitive game, where the game is divided into an ally camp and an enemy camp, and the ally camp includes a virtual object controlled by the terminal and an artificial intelligence object. In the case where a player issues a control instruction to the artificial intelligence object in the ally camp, the terminal may detect out the control instruction and control, based on the control instruction, the artificial intelligence object in the ally camp to perform a target operation corresponding to the control instruction. For example, when the control instruction is an assembling instruction, the terminal may control the artificial intelligence object of the ally camp to move towards the virtual object controlled by the terminal until all members assemble, realizing control over the artificial intelligence object.

For another example, in a real battle simulation scenario:

after purchasing a new hero, a player needs to play the game many times to become familiar with the hero, and real battle simulation well meets the need of the player for training the new hero. In the real battle simulation, heroes of two human players are paired with three artificial intelligence objects to form a team, five artificial intelligence objects are paired to form an enemy team, and the two teams combat with each other. By adoption of the method according to this embodiment of this application, players may control not only their heroes, but also artificial intelligence objects in the same team.

Figure 2:
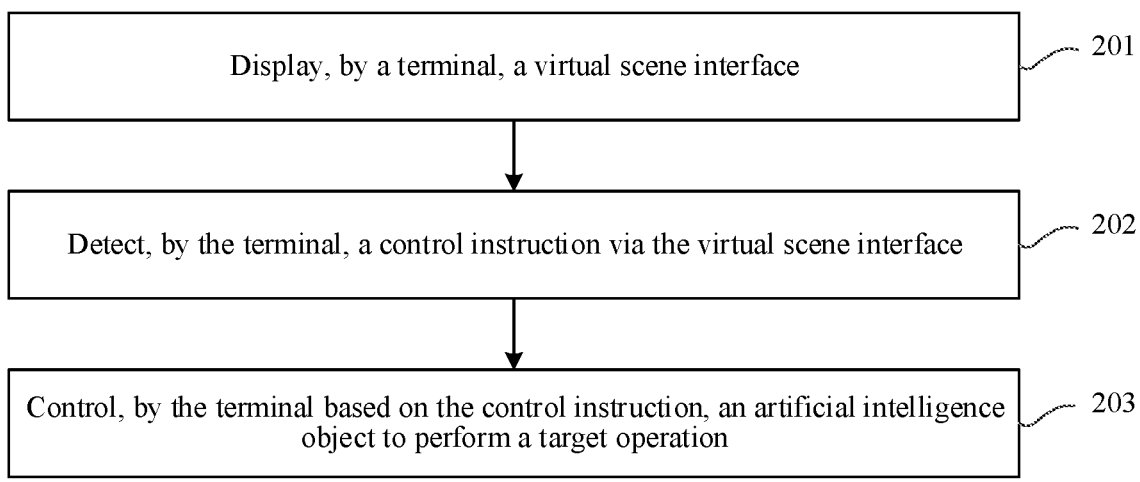
FIG. 2 is a flowchart of an artificial intelligence object control method according to an embodiment of this application.

FIG. 2 is a flowchart of an artificial intelligence object control method according to an embodiment of this application. The method is performed by a terminal. As shown in FIG. 2, the method includes the following steps:

201: Display, by the terminal, a virtual scene interface.

A virtual scene of this embodiment of this application includes virtual objects of at least two hostile camps, and each camp may include a virtual object manipulated by the terminal, an artificial intelligence object, and objects such as a turret. The artificial intelligence object refers to an object manipulated based on a neural network model, and the artificial intelligence object may also be referred to as an AI agent.

While the terminal displays the virtual scene interface, a virtual object controlled by the terminal is displayed in the virtual scene interface. In addition, other objects besides the controlled virtual object may also be displayed, for example, objects in an ally camp of the controlled virtual object or objects in a non-ally camp of the controlled virtual object. The objects in the non-ally camp of the controlled virtual object include: objects in the enemy camp of the controlled virtual object, and neutral objects such as a neutral creep.

In one possible implementation, where the virtual scene interface displays the virtual scene in a first-person perspective of the virtual object controlled by the terminal, a part of the virtual scene within the view of the controlled virtual object and other objects located in the part of the virtual scene are displayed in the virtual scene interface.

In another possible implementation, where the virtual scene interface displays the virtual scene in a third-person perspective, a part of the virtual scene within the perspective range of the third-person perspective and the controlled virtual object and other objects located in the part of the virtual scene are displayed in the virtual scene interface.

202: Detect, by the terminal, a control instruction via the virtual scene interface.

This embodiment of this application provides a solution for the interaction between human and the artificial intelligence object, where the user triggers the control instruction in the virtual scene interface, the control instruction is used for instructing the artificial intelligence object in the ally camp of the controlled virtual object to perform a target operation, and subsequently the artificial intelligence object may be controlled, based on the control instruction, to perform the target operation, thereby simulating an effect that the artificial intelligence object performs an operation based on the instruction of the user. That is, collaboration between the user and the artificial intelligence object is achieved, and collaboration between the controlled virtual object and the artificial intelligence object is achieved in the virtual scene.

The control instruction may be triggered by at least one operation of a user in the virtual scene interface, for example, clicking a control, dragging a control, sliding, or selecting an object.

In some embodiments, the control instruction is an attack instruction, or a retreat instruction, or an assembling instruction, or other control instructions.

The following are examples of the control instruction:

In some embodiments, when the control instruction is an attack instruction, the terminal detects the attack instruction via the virtual scene interface, the attack instruction being used for instructing an artificial intelligence object to attack a first target virtual object in the non-ally camp.

In some embodiments, the attack instruction is detected via the virtual scene interface in the following manners:

Firstly, a trigger operation on an attack control is detected via the virtual scene interface, and the attack instruction is generated, the attack instruction being used for instructing the artificial intelligence object to attack a virtual object closest to the virtual object controlled by the terminal in the non-ally camp.

The attack control is displayed in the virtual scene interface, and the user may initiate the attack instruction by triggering the attack control. In this case, the first target virtual object required to be attacked this time is, by default: the virtual object closest to the virtual object controlled by the terminal in the non-ally camp.

In addition, the attack instruction is also used for instructing other virtual objects in the ally camp of the controlled virtual object to also attack the virtual object closest to the virtual object controlled by the terminal in the non-ally camp.

In addition, the trigger operation on the attack control may be a click operation on the attack control, a long-press operation on the attack control, or a drag operation on the attack control, or other operations on the attack control.

Secondly, an operation of dragging the attack control to an object identifier of the first target virtual object is detected via the virtual scene interface, and the attack instruction is generated, the attack instruction being used for instructing the artificial intelligence object to attack the virtual object corresponding to the object identifier.

The attack control and an object identifier of at least one object in the virtual scene are displayed in the virtual scene interface. The object identifier is used for determining a unique object, which may be an icon or a name, etc. of the virtual object.

The attack instruction may be initiated when the user drags the attack control to the object identifier of the first target virtual object, and accordingly the object to be attacked this time is the first target virtual object corresponding to the object identifier. The first target virtual object may be any object in the non-ally camp, for example, the first target virtual object is a virtual object in the enemy camp, or an artificial intelligence object in the enemy camp, or a turret in the enemy camp, or a neutral creep, or another virtual object. The user may instruct to attack different virtual objects by dragging the attack control to different object identifiers.

In addition, the attack instruction is also used for instructing other virtual objects in the ally camp of the controlled virtual object to also attack the first target virtual object corresponding to the object identifier.

Figure 3:
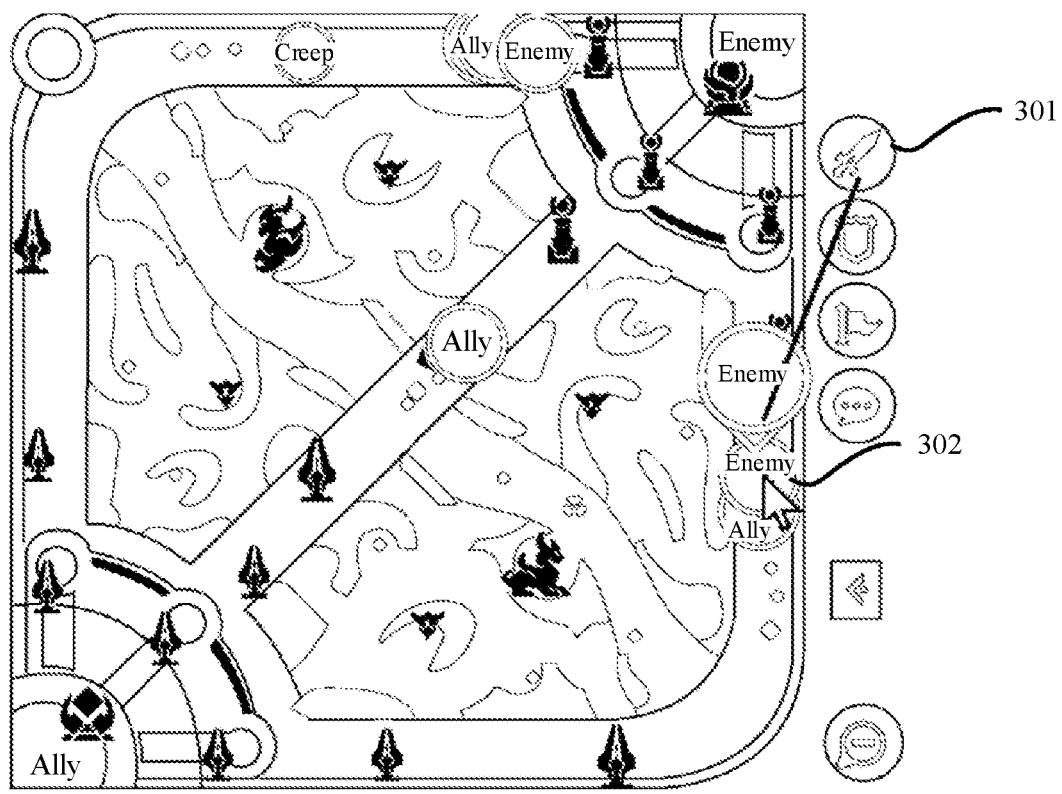
FIG. 3 is a schematic diagram of a virtual scene interface according to an embodiment of this application.

As shown in FIG. 3, a thumbnail map of the virtual scene is displayed in the virtual scene interface, and a user may click on the thumbnail map to zoom in the thumbnail map, that is, the map of the virtual scene and the attack control 301 are displayed in the virtual scene interface. In addition, icons of objects are displayed in the map. An object identifier 302 is an icon of a hero in the enemy camp. The attack instruction may be generated when the user drags the attack control 301 to the object identifier 302, and the attack instruction is used for instructing the artificial intelligence object in the ally camp to attack the hero corresponding to the object identifier 302.

Figure 4:
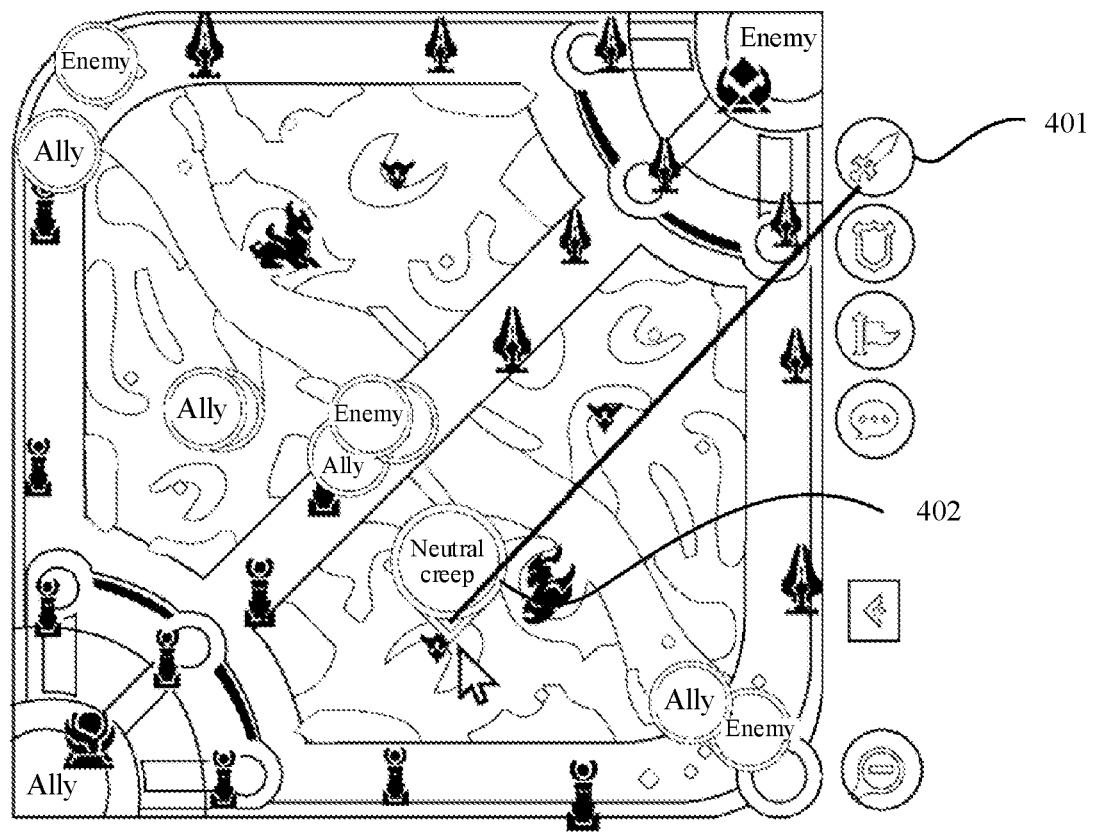
FIG. 4 is a schematic diagram of another virtual scene interface according to an embodiment of this application.

As shown in FIG. 4, a thumbnail map of the virtual scene is displayed in the virtual scene interface, and a user may click on the thumbnail map to zoom in the thumbnail map, that is, the map of the virtual scene and the attack control 401 are displayed in the virtual scene interface. In addition, icons of objects are displayed in the map. An object identifier 402 is an icon of a neutral creep. The attack instruction may be generated when the user drags the attack control 401 to the object identifier 402, and the attack instruction is used for instructing the artificial intelligence object in the ally camp to attack the neutral creep corresponding to the object identifier 402.

Thirdly, a selection operation on the object identifier of the first target virtual object is detected via the virtual scene interface, and the attack instruction is generated, the attack instruction being used for instructing the artificial intelligence object to attack the virtual object corresponding to the object identifier.

The object identifier of at least one object in the virtual scene is displayed in the virtual scene interface. The object identifier is used for determining the unique object, which may be the icon or the name, etc. of the virtual object.

The attack instruction may be initiated when the user triggers the selection operation on the object identifier of the first target virtual object, and accordingly the object to be attacked this time is the first target virtual object corresponding to the object identifier. The first target virtual object may be any object in the non-ally camp, for example, the first target virtual object is a virtual object in the enemy camp, or an artificial intelligence object in the enemy camp, or a turret in the enemy camp, or a neutral creep, or another virtual object. The user may instruct to attack different virtual objects by selecting different object identifiers.

In addition, the attack instruction is also used for instructing other virtual objects in the ally camp of the controlled virtual object to also attack the virtual object corresponding to the object identifier.

Figure 5:
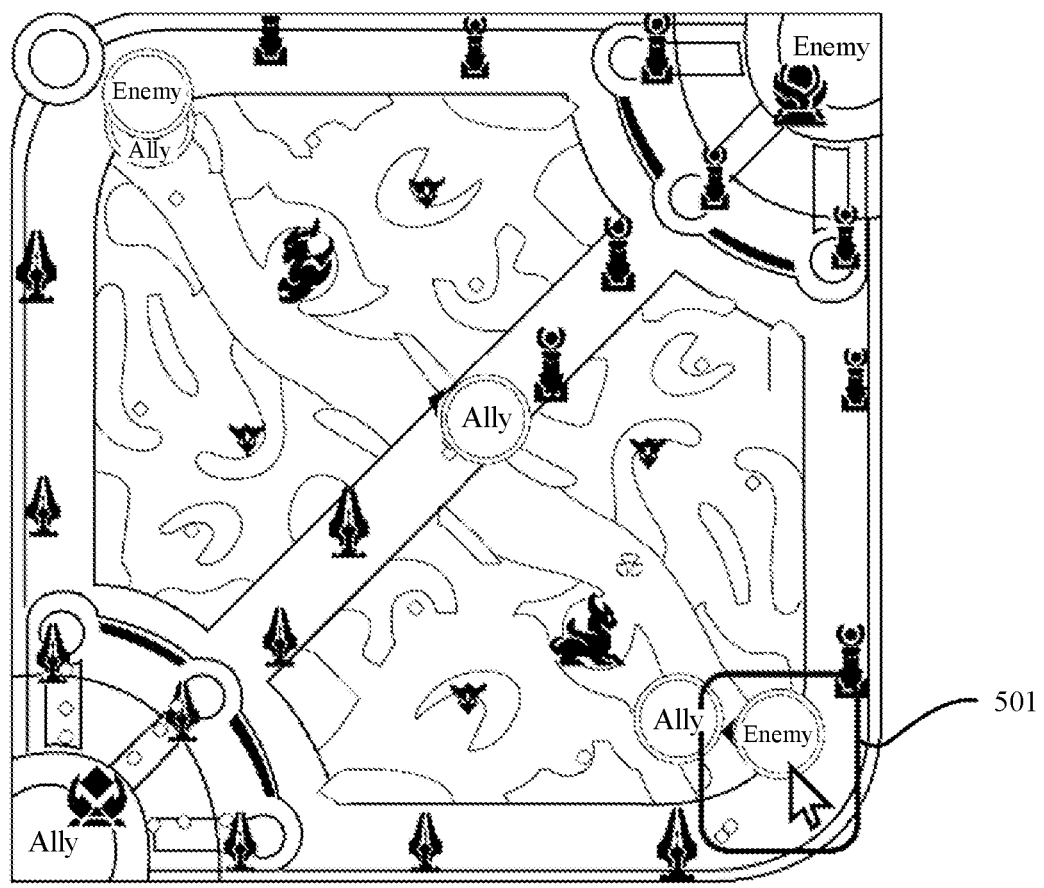
FIG. 5 is a schematic diagram of yet another virtual scene interface according to an embodiment of this application.

As shown in FIG. 5, the map of the virtual scene and the icons of objects are displayed in the virtual scene interface, where an object identifier 501 is an icon of a hero in the enemy camp. The attack instruction may be generated when the user triggers a selection operation on the object identifier 501, and the attack instruction is used for instructing the artificial intelligence object to attack the hero corresponding to the object identifier 501.

Figure 6:
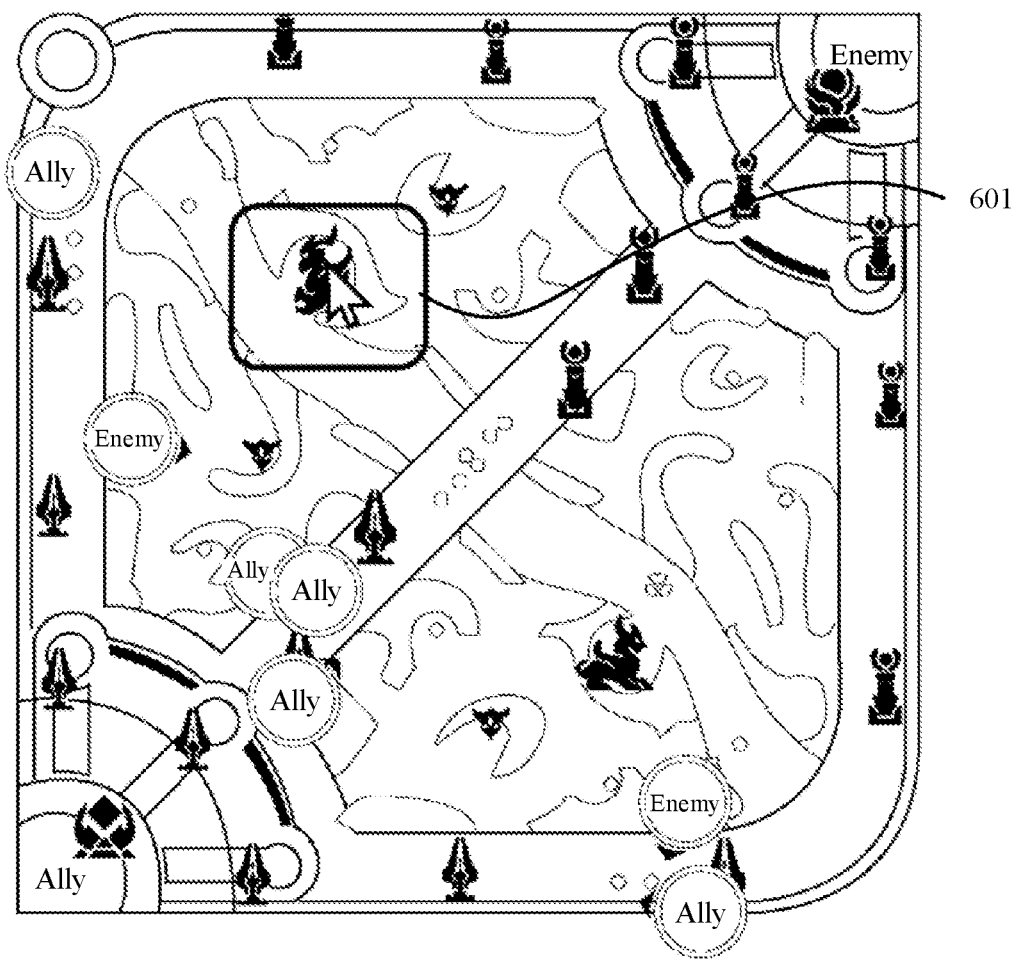
FIG. 6 is a schematic diagram of yet another virtual scene interface according to an embodiment of this application.

As shown in FIG. 6, the map of the virtual scene and the icons of objects are displayed in the virtual scene interface, where an object identifier 601 is an icon of a neutral creep. The attack instruction may be generated when the user triggers a selection operation on the object identifier 601, and the attack instruction is used for instructing the artificial intelligence object to attack the neutral creep corresponding to the object identifier 601.

Figure 7:
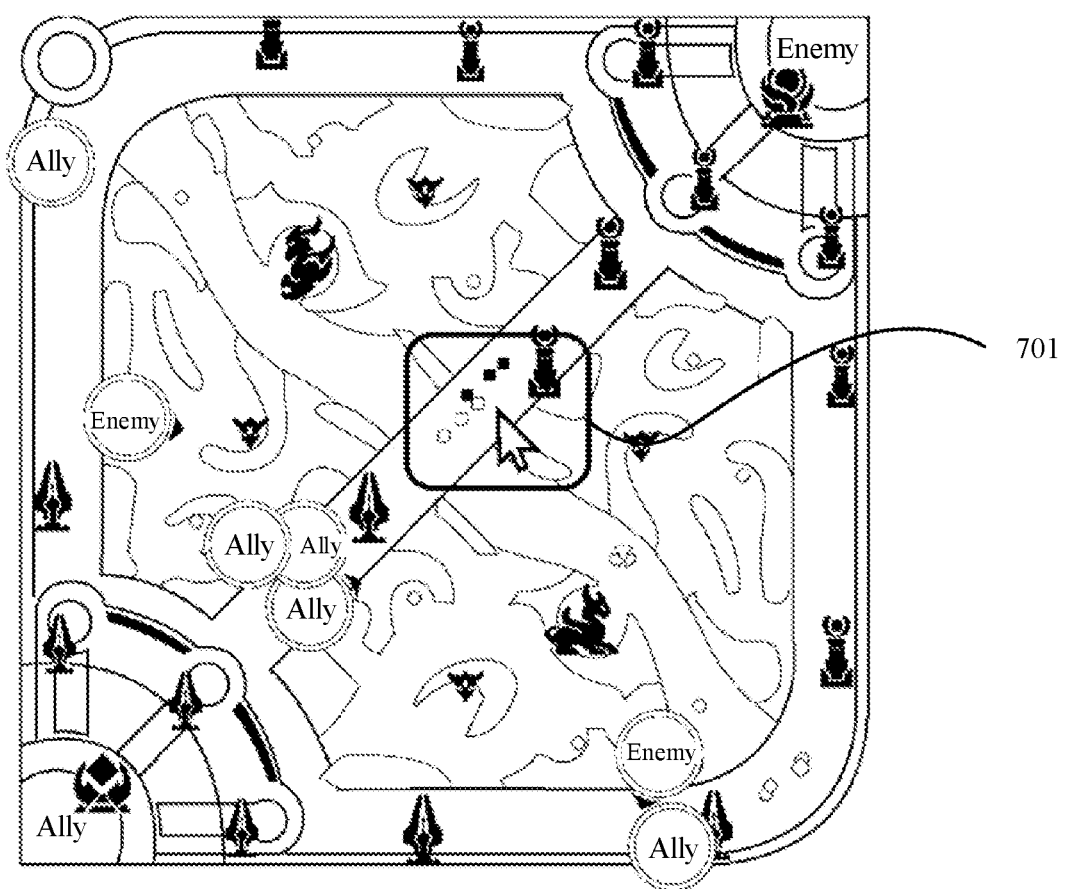
FIG. 7 is a schematic diagram of yet another virtual scene interface according to an embodiment of this application.

As shown in FIG. 7, the map of the virtual scene and the icons of objects are displayed in the virtual scene interface, where an object identifier 701 is an icon of a creep in the enemy camp. The attack instruction may be generated when the user triggers a selection operation on the object identifier 701, and the attack instruction is used for instructing the artificial intelligence object to attack the creep corresponding to the object identifier 701.

In this embodiment of this application, the user may instruct the artificial intelligence object in the ally camp to perform an attack only by triggering the attack instruction, realizing the interaction between the user and the artificial intelligence object. Therefore, the operation efficiency of the ally camp is improved, and the team combat capability of the ally camp is enhanced, thereby helping the ally camp better complete team tasks.

In some embodiments, when the control instruction is a retreat instruction, the terminal detects the retreat instruction via the virtual scene interface, the retreat instruction being used for instructing the artificial intelligence object to retreat to a safe position.

In some embodiments, the retreat instruction is detected via the virtual scene interface in the following manners:

Firstly, a trigger operation on a retreat control is detected via the virtual scene interface, and the retreat instruction is generated, the retreat instruction being used for instructing the artificial intelligence object to retreat to the safe position.

The retreat control is displayed in the virtual scene interface, and when the user triggers the retreat control, the retreat instruction may be initiated to instruct the artificial intelligence object to retreat to the safe position. In this case, the safe position is a safe position nearest to each artificial intelligence object by default, or a position where a turret nearest to each artificial intelligence object is located in the ally camp, or other positions.

In addition, the retreat instruction is also used for instructing other virtual objects in the ally camp of the controlled virtual object to also retreat to the safe position.

In addition, the trigger operation on the retreat control may be a click operation on the retreat control, a long-press operation on the retreat control, or a drag operation on the retreat control, or other operations on the retreat control.

Secondly, an operation of dragging the retreat control to an object identifier of a third target virtual object of the ally camp is detected via the virtual scene interface, and the retreat instruction is generated, the retreat instruction being used for instructing the artificial intelligence object to retreat to a position of the third target virtual object.

The retreat control and the object identifier of at least one object in the virtual scene are displayed in the virtual scene interface. The object identifier is used for determining the unique object, which may be the icon or the name, etc. of the virtual object.

The retreat instruction may be initiated when the user drags the retreat control to the object identifier of the third target virtual object, and accordingly the artificial intelligence object needs to retreat to the position where the third target virtual object is located this time. The third target virtual object may be any object in the ally camp, for example, the third target virtual object is a virtual object in the ally camp, or an artificial intelligence object in the ally camp, or a turret in the ally camp. The user may instruct the artificial intelligence object to retreat to positions where different virtual objects are located by dragging the retreat control to different object identifiers.

In addition, the retreat instruction is also used for instructing other virtual objects in the ally camp of the controlled virtual object to also retreat to the position where the third target virtual object is located.

Figure 8:
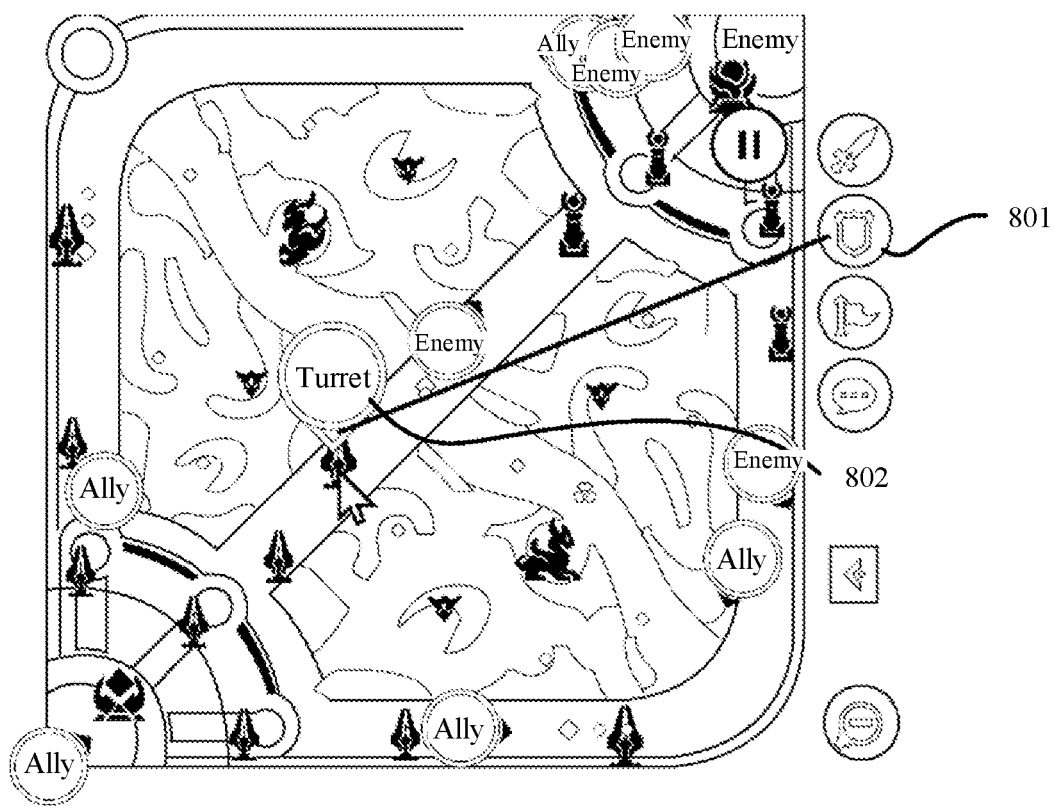
FIG. 8 is a schematic diagram of yet another virtual scene interface according to an embodiment of this application.

As shown in FIG. 8, the thumbnail map of the virtual scene is displayed in the virtual scene interface, and the user may click on the thumbnail map to zoom in the thumbnail map, that is, the map of the virtual scene and the retreat control 801 are displayed in the virtual scene interface. In addition, icons of objects are displayed in the map. An object identifier 802 is an icon of a turret in the ally camp. The retreat instruction may be generated when the user drags the retreat control 801 to the object identifier 802, and the retreat instruction is used for instructing the artificial intelligence object to retreat to the position where the turret corresponding to the object identifier 802 is located.

Thirdly, a selection operation on the object identifier of the third target virtual object is detected via the virtual scene interface, and the retreat instruction is generated, the retreat instruction being used for instructing the artificial intelligence object to retreat to the position of the third target virtual object.

The object identifier of at least one object in the virtual scene is displayed in the virtual scene interface. The object identifier is used for determining the unique object, which may be the icon or the name, etc. of the virtual object.

The retreat instruction may be initiated when the user triggers the selection operation on the object identifier of the third target virtual object, and accordingly the artificial intelligence object needs to retreat to the position where the third target virtual object is located this time. The third target virtual object may be any object in the ally camp, for example, the third target virtual object is a virtual object in the ally camp, or an artificial intelligence object in the ally camp, or a turret in the ally camp. The user may instruct the artificial intelligence object to retreat to positions where different virtual objects are located by selecting different object identifiers.

In addition, the retreat instruction is also used for instructing other virtual objects in the ally camp of the controlled virtual object to also retreat to the position where the third target virtual object is located.

Figure 9:
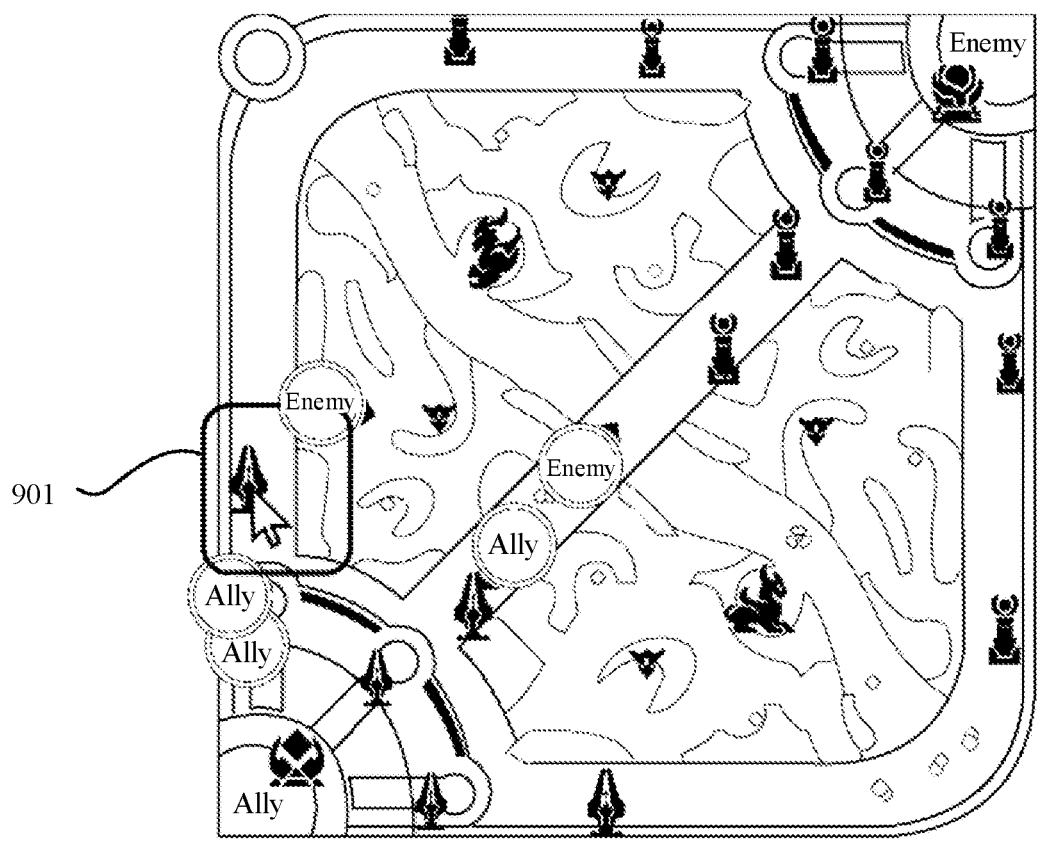
FIG. 9 is a schematic diagram of yet another virtual scene interface according to an embodiment of this application.

As shown in FIG. 9, the map of the virtual scene and the icons of objects are displayed in the virtual scene interface, where an object identifier 901 is an icon of a turret in the ally camp. The retreat instruction may be generated when the user triggers a selection operation on the object identifier 901, and the retreat instruction is used for instructing the artificial intelligence object to retreat to the position where the turret corresponding to object identifier 901 is located.

In some embodiments, when the control instruction is an assembling instruction, the terminal detects the assembling instruction via the virtual scene interface, the assembling instruction being used for instructing the artificial intelligence object to move towards a position of the controlled virtual object or a second target virtual object of the ally camp.

In this embodiment of this application, the user may instruct the artificial intelligence object in the ally camp to retreat to the safe position only by triggering the retreat instruction, realizing the interaction between the user and the artificial intelligence object. Therefore, the operation efficiency of the ally camp is improved, and the team combat capability of the ally camp is enhanced, thereby helping to protect the artificial intelligence object in the ally camp.

In some embodiments, the assembling instruction is detected via the virtual scene interface in the following manners:

Firstly, a trigger operation on an assembling control is detected via the virtual scene interface, and the assembling instruction is generated, the assembling instruction being used for instructing the artificial intelligence object to move towards the position of the controlled virtual object.

The assembling control is displayed in the virtual scene interface, and the assembling instruction may be initiated when the user triggers the assembling control. In this case, the artificial intelligence object needs to reach the position where the controlled virtual object is located by default, so as to assemble with virtual objects in the ally camp, that is, the artificial intelligence object needs to move towards the position where the controlled virtual object is located.

Moreover, the assembling instruction is also used for instructing other virtual objects in the ally camp of the controlled virtual object to also move towards the position where the controlled virtual object is located.

Moreover, the trigger operation on the assembling control may be a click operation on the assembling control, a long-press operation on the assembling control, or a drag operation on the assembling control, or other operations on the assembling control.

Secondly, an operation of dragging the assembling control to an object identifier of the second target virtual object of the ally camp is detected via the virtual scene interface, and the assembling instruction is generated, the assembling instruction being used for instructing the artificial intelligence object to move towards the position of the second target virtual object.

The assembling control and the object identifier of at least one object in the virtual scene are displayed in the virtual scene interface. The object identifier is used for determining the unique object, which may be the icon or the name, etc. of the virtual object.

When the user drags the assembling control to the object identifier of the second target virtual object, the assembling instruction may be initiated, instructing that the artificial intelligence object needs to move to the position where the second target virtual object is located. The second target virtual object may be any object in the ally camp, for example, the second target virtual object is a virtual object in the ally camp, or an artificial intelligence object in the ally camp, or a turret in the ally camp. The user may instruct the artificial intelligence object to retreat to positions where different virtual objects are located by dragging the assembling control to object identifiers of the different virtual objects.

Moreover, the assembling instruction is also used for instructing other virtual objects in the ally camp of the controlled virtual object to also move towards the position where the second target virtual object corresponding to the object identifier is located.

Figure 10:
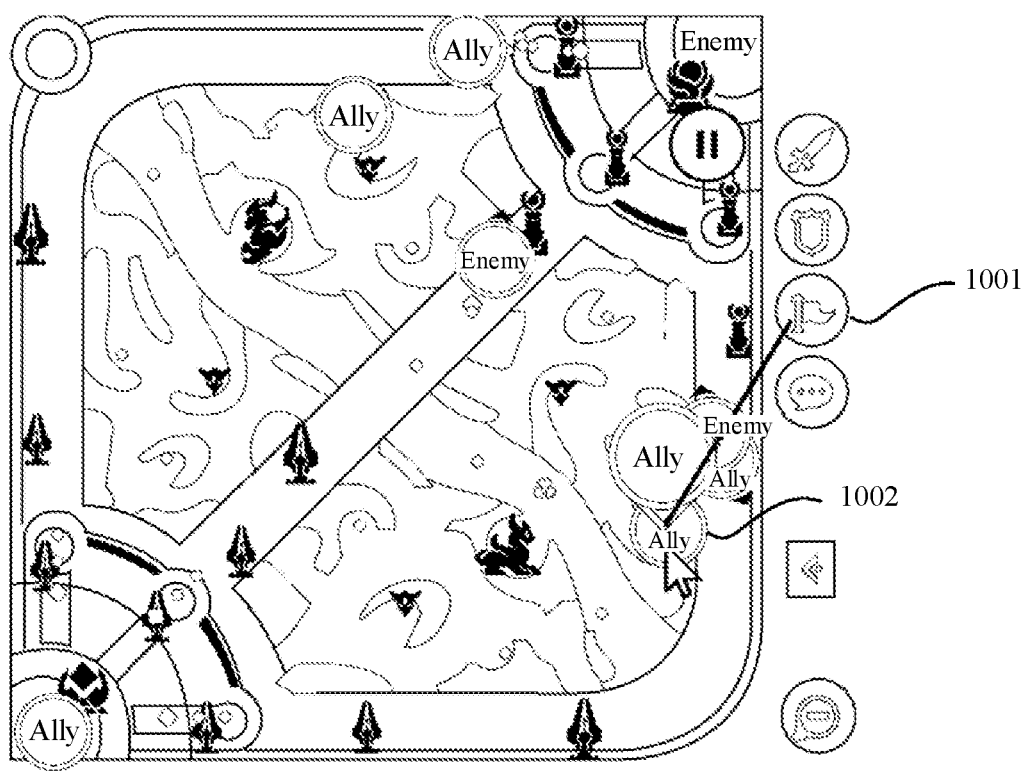
FIG. 10 is a schematic diagram of yet another virtual scene interface according to an embodiment of this application.

As shown in FIG. 10, the thumbnail map of the virtual scene is displayed in the virtual scene interface, and the user may click on the thumbnail map to zoom in the thumbnail map, that is, the map of the virtual scene and the assembling control 1001 are displayed in the virtual scene interface. In addition, icons of objects are displayed in the map. An object identifier 1002 is an icon of a hero in the ally camp. The assembling instruction may be generated when the user drags the assembling control 1001 to the object identifier 1002, and the assembling instruction is used for instructing the artificial intelligence object to move towards the position where the hero corresponding to the object identifier 1002 is located.

Thirdly, a selection operation on the object identifier of the second target virtual object is detected via the virtual scene interface, and the assembling instruction is generated, the assembling instruction being used for instructing the artificial intelligence object to move towards the position of the second target virtual object.

The object identifier of at least one object in the virtual scene is displayed in the virtual scene interface. The object identifier is used for determining the unique object, which may be the icon or the name, etc. of the virtual object.

When the user triggers the selection operation on the object identifier of the second target virtual object, the assembling instruction may be initiated, instructing that the artificial intelligence object needs to move towards the position where the second target virtual object is located. The second target virtual object may be any object in the ally camp, for example, the second target virtual object is a virtual object in the ally camp, or an artificial intelligence object in the ally camp, or a turret in the ally camp.

Moreover, the assembling instruction is also used for instructing other virtual objects in the ally camp of the controlled virtual object to also move towards the position where the second target virtual object corresponding to the object identifier is located.

In this embodiment of this application, the user may instruct the artificial intelligence object in the ally camp to assemble only by triggering the assembling instruction, realizing the interaction between the user and the artificial intelligence object. Therefore, the operation efficiency of the ally camp is improved, and the team combat capability of the ally camp is enhanced, thereby helping the ally camp better complete team tasks.

203: Control, by the terminal based on the control instruction, the artificial intelligence object to perform the target operation.

After detecting the control instruction, the terminal may control, based on the control instruction, the artificial intelligence object to perform the target operation. For example, if the control instruction is the attack instruction, the artificial intelligence object is controlled, based on the control instruction, to attack the first target virtual object in the non-ally camp. Alternatively, if the control instruction is the retreat instruction, the artificial intelligence object is controlled, based on the retreat instruction, to retreat to the safe position. Alternatively, if the control instruction is the assembling instruction, the artificial intelligence object is controlled, based on the assembling instruction, to assemble.

In some embodiments, the control instruction carries an object identifier of a target virtual object, and the target operation refers to an operation of moving towards the target virtual object, so that the terminal may control the artificial intelligence object to perform the operation of moving towards the target virtual object based on the control instruction. For example, the above-mentioned attack instruction, retreat instruction or assembling instruction may all be considered as operations instructing the artificial intelligence object to move towards the target virtual object, and therefore the artificial intelligence object may be controlled to move based on the instructions.

In this embodiment of this application, controlling the artificial intelligence object to perform the target operation based on the control instruction means to control the artificial intelligence object to start to perform the target operation without limiting whether the artificial intelligence object needs to complete the target operation. For example, in the process of controlling the artificial intelligence object to move, if the artificial intelligence object meets other virtual objects in the non-ally camp, the artificial intelligence object combats with the other virtual objects instead of continuing to move as directed by the control instruction. After the combat is completed, the artificial intelligence object may continue to move as directed by the control instruction, or may no longer respond to the control instruction.

Moreover, this embodiment of this application is illustrated only with the execution subject being the terminal, while in another embodiment, the terminal is connected to a server, and the artificial intelligence object on the terminal is actually controlled by the server based on a neural network model, so that the terminal needs to interact with the server in order to realize control over the artificial intelligence object.

In some embodiments, after detecting the control instruction, the terminal transmits the control instruction to the server, the server calls, based on the control instruction, the neural network model to determine at least one sub-operation for completing the target operation, and the artificial intelligence object is controlled to perform the at least one sub-operation.

The neural network model is provided in the server, and the neural network model is used for predicting an operation to be performed by the artificial intelligence object. At each moment, the server acquires status data of the current moment, calls the neural network to process the status data so as to predict the operation to be performed by the artificial intelligence object, and transmits the operation to the terminal corresponding to the artificial intelligence object, so as to cause the terminal to display a scene in which the artificial intelligence object performs the operation, thus realizing the effect of controlling the artificial intelligence object to perform the operation.

In this embodiment of this application, in order to respond to the control instruction, the artificial intelligence object needs to perform the target operation, so that at each moment, the server may call the neural network model to determine the sub-operations for completing the target operation, so as to control the artificial intelligence object to perform the sub-operations. An interval between any two adjacent moments may be a preset target duration, and the server controls the artificial intelligence object to perform a sub-operation once every the target duration, so that after at least one control, the artificial intelligence object may perform at least one sub-operation to meet the requirements of the control instruction. Thus, the sub-operations may be regarded as decomposed operations of the target operation.

The detailed process for the server to respond to the control instruction may be referred to an embodiment shown in FIG. 11 hereinafter, and will not be repeated here.

According to this embodiment of this application, the function of the artificial intelligence object is extended, and the artificial intelligence object with controllable operations is provided. The user can control the artificial intelligence object belonging to the same camp as the controlled virtual object to perform the target operation only by transmitting the control instruction, achieving control over the artificial intelligence object. Therefore, collaboration between human and the artificial intelligence object is achieved.

In addition, the control instruction includes the attack instruction, the retreat instruction, the assembling instruction and other instructions, so that the diversity of the control instruction is enhanced, and different types of control over the artificial intelligence object are achieved.

In addition, a plurality of triggering manners for each control instruction are provided, providing users with a plurality of options for easy operation.

Based on the above embodiment, the artificial intelligence object may be controlled by the server by calling the neural network model. The process of controlling the artificial intelligence object will be described in detail below in conjunction with FIG. 11.

Figure 11:
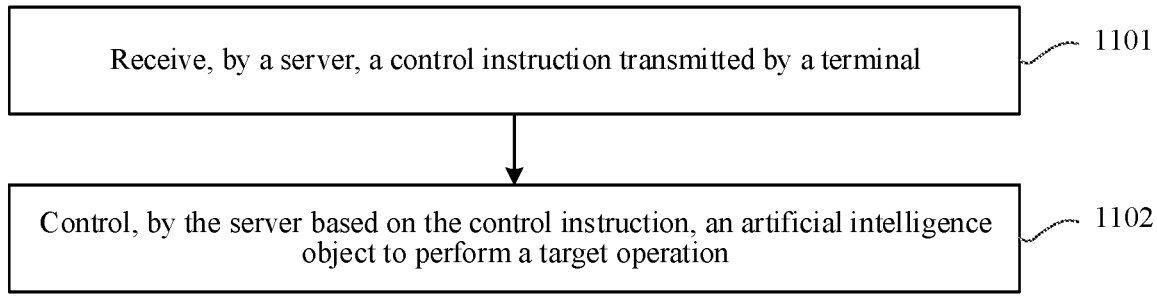
FIG. 11 is a flowchart of an artificial intelligence object control method according to an embodiment of this application.

FIG. 11 is a flowchart of an artificial intelligence object control method according to an embodiment of this application. The method is performed by a server. As shown in FIG. 11, the method includes the following steps:

1101: Receive, by the server, a control instruction transmitted by a terminal.

In this embodiment of this application, the server is connected to the terminal. The terminal has a corresponding controlled virtual object, while a virtual scene and an artificial intelligence object are created in the server. In addition, a neural network model may be provided, and the artificial intelligence object is controlled, based on the neural network model, to perform an operation. In the virtual scene, the virtual object controlled by the terminal and the artificial intelligence object belong to the same camp, and may cooperate to perform the operation.

In order to facilitate collaboration with the artificial intelligence object, a user triggers the control instruction on the terminal, and the terminal transmits the control instruction to the server, the control instruction being used for instructing the artificial intelligence object to perform a target operation. The process for the terminal to acquire the control instruction is described in detail in the above-mentioned embodiment shown in FIG. 2, and will not be repeated here.

1102: Control, by the server based on the control instruction, the artificial intelligence object to perform the target operation.

The artificial intelligence object belongs to an ally camp of the virtual object controlled by the terminal.

For example, if the control instruction is the attack instruction, the artificial intelligence object is controlled, based on the control instruction, to attack the first target virtual object in the non-ally camp. Alternatively, if the control instruction is a retreat instruction, the artificial intelligence object is controlled, based on the retreat instruction, to retreat to a safe position. Alternatively, if the control instruction is an assembling instruction, the artificial intelligence object is controlled, based on the assembling instruction, to assemble.

In some embodiments, the control instruction carries an object identifier of a target virtual object, and the target operation refers to an operation of moving towards the target virtual object, so that the artificial intelligence object may be controlled, based on the control instruction, to perform the operation of moving towards the target virtual object. For example, the above-mentioned attack instruction, retreat instruction or assembling instruction may all be considered as operations instructing the artificial intelligence object to move towards the target virtual object, and therefore the artificial intelligence object may be controlled to move based on the instructions.

According to this embodiment of this application, the function of the artificial intelligence object is extended, and the artificial intelligence object with controllable operations is provided. The user can control the artificial intelligence object belonging to the same camp as the controlled virtual object to perform the target operation only by transmitting the control instruction, achieving control over the artificial intelligence object. Therefore, collaboration between human and the artificial intelligence object is achieved.

Figure 12:
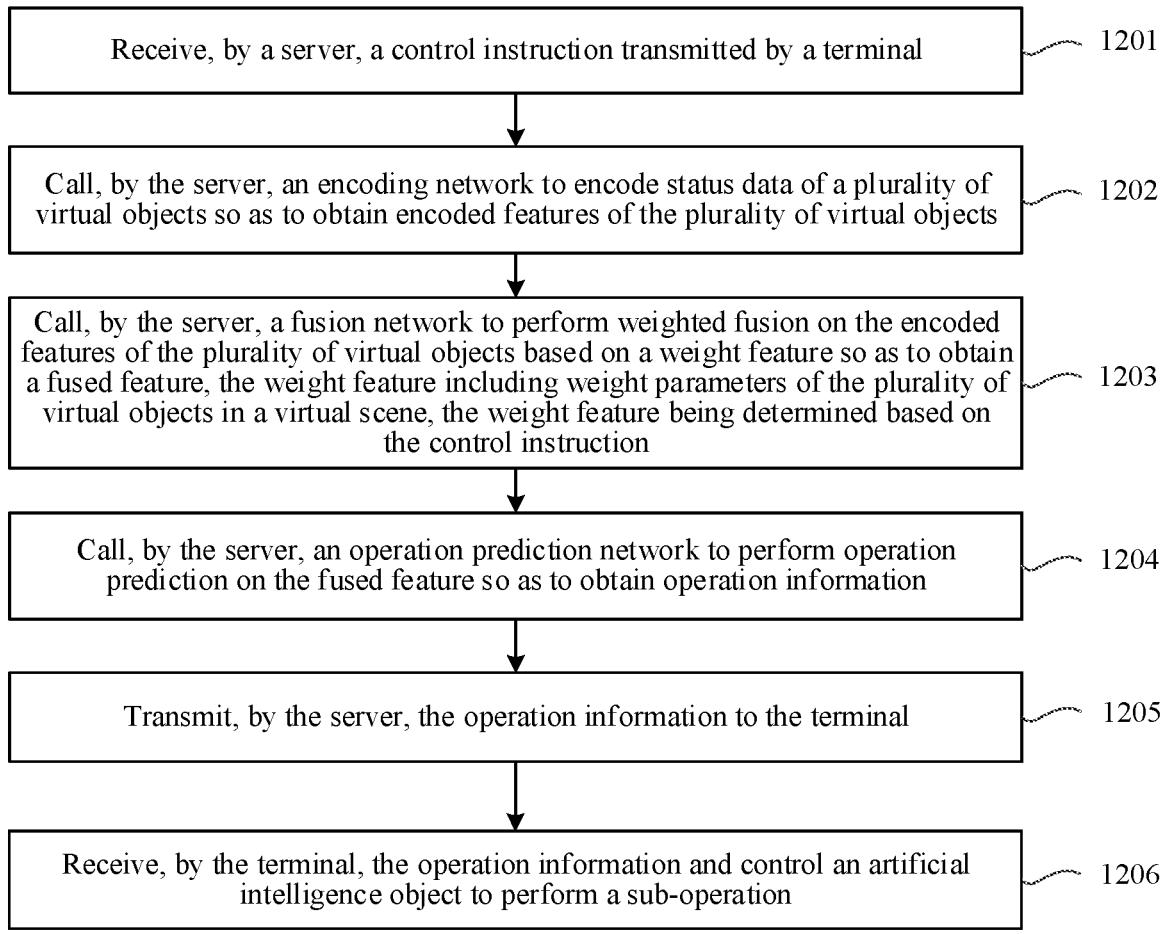
FIG. 12 is a flowchart of another artificial intelligence object control method according to an embodiment of this application.

FIG. 12 is a flowchart of an artificial intelligence object control method according to an embodiment of this application. The method is performed by a server, and the method provides a detailed description of the process in which an artificial intelligence object is controlled by the server to perform a sub-operation. As shown in FIG. 12, the method includes the following steps:

1201: Receive, by the server, a control instruction transmitted by a terminal.

The control instruction is used for instructing the artificial intelligence object to perform a target operation.

Step 1201 is similar to the above-mentioned embodiments shown in FIG. 2 and FIG. 11 and will thus not be repeated here.

After receiving the control instruction, the server needs to call a neural network model to control the artificial intelligence object to perform the target operation corresponding to the control instruction. However, considering the complexity and variability of each object in the virtual scene, directly controlling the artificial intelligence object to perform the target operation is likely to be inconsistent with a current status of the virtual scene. Therefore, in order to ensure the authenticity of the virtual scene and ensure the continuity of the operation performed by the artificial intelligence object, the server may call, based on the control instruction, the neural network model to determine at least one sub-operation for completing the target operation, and control the artificial intelligence object to perform the at least one sub-operation, so as to meet the requirements of the control instruction.

For example, at each moment, the server calls, based on the control instruction, the neural network model to determine a sub-operation and issues the sub-operation to the terminal, then the terminal may control the artificial intelligence object to perform the sub-operation, and the artificial intelligence object performing the sub-operation is displayed in a display interface. Then, at the next moment, the server calls, based on the control instruction, the neural network model to determine the next sub-operation and issues the next sub-operation to the terminal, and then the terminal may control the artificial intelligence object to perform the next sub-operation. By analogy, the artificial intelligence object may be controlled to perform a plurality of sub-operations as directed by the control instruction. An interval between any two adjacent moments is a preset target duration, and the server controls the artificial intelligence object to perform a sub-operation once every the target duration.

In addition, this embodiment of this application is illustrated with the neural network model including an encoding network, a fusion network, and an operation prediction network. The process of calling the neural network model for processing is described in detail in steps 1202-1204 below.

1202: Call, by the server, the encoding network to encode status data of a plurality of virtual objects so as to obtain encoded features of the plurality of virtual objects.

The status data of each of the virtual objects is used for representing a current status of the virtual object, for example, the status data of the virtual object includes a name, type, hit points, skill type, etc. of the virtual object. The encoding network is used for encoding the status data of the virtual objects to obtain the encoded features. Thus, the encoded features may also reflect the current status of the virtual object. The encoded features are processed subsequently, and an operation that the artificial intelligence object is able to perform may be determined by considering the current status of the virtual object.

1203: Call, by the server, the fusion network to perform weighted fusion on the encoded features of the plurality of virtual objects based on a weight feature so as to obtain a fused feature, the weight feature including weight parameters of the plurality of virtual objects in the virtual scene, the weight feature being determined based on the control instruction.

The fusion network includes the weight feature. The weight feature includes the weight parameters of the plurality of virtual objects in the virtual scene, and is used for representing the influence degree of the plurality of virtual objects when the operation to be performed by the artificial intelligence object is predicted. By performing the weighted fusion on the encoded features of the plurality of virtual objects based on the weight feature, the different influence degrees of the different virtual objects may be considered, so as to ensure that the operation determined for the artificial intelligence object matches the current status of the plurality of virtual objects in the virtual scene, and the determined operation is accurate. However, in order to control that the operation performed by the artificial intelligence object is an operation corresponding to the control instruction, before predicting the operation, the server first determines the weight feature in the fusion network based on the control instruction.

In one possible implementation, the control instruction includes a first object identifier of the controlled virtual object and a second object identifier of the target virtual object, and the target operation refers to an operation of moving towards the target virtual object, that is, the control instruction is used for instructing the artificial intelligence object to move towards the target virtual object. Accordingly, determining the weight feature in the fusion network based on the control instruction includes: form an encoded matrix with the encoded features of the plurality of virtual objects, determine a first weight feature based on a matrix obtained by multiplying the encoded matrix by a transpose matrix of the encoded matrix, and set a weight parameter of a non-associated virtual object in the first weight feature as negative infinity to obtain a second weight feature; and perform normalization processing on the second weight feature, and determine the normalized weight feature as the weight feature in the fusion network. A distance between the non-associated virtual object and the controlled virtual object and a distance between the non-associated virtual object and the target virtual object are not less than a distance threshold.

In some embodiments, the following provides an operational flow for determining the weight feature, including the following steps:

1. Input w_logit-$[FFT]_1/\sqrt{d}$ and $F=[f_1; f_2; \ldots ; f_n]$, where w_logit denotes the weight feature, F denotes the encoded matrix, $f_i$ denotes an encoded feature of an i-th virtual object, i and n are positive integers, n represents the quantity of virtual objects, i is less than or equal to n, $1/\sqrt{d}$ is a zoom factor, and $[\bullet]_1$ denotes a first row vector of the matrix.

Based on the above formula, the process of inputting the weight feature includes: extract the first row vector from the matrix obtained by multiplying the encoded matrix by the transpose matrix of the encoded matrix, and determine a product of the first row vector and the zoom factor as the weight feature.

2. Acquire a selective attention set S, and add the controlled virtual object and the target virtual object of the terminal to the selective attention set S.

3. If a distance between the encoded feature of the i-th virtual object and the encoded feature of the virtual object controlled by the terminal is less than the distance threshold, the i-th virtual object is a non-associated virtual object of the controlled virtual object, and then the i-th virtual object is added to the selective attention set S 4. If a distance between the encoded feature of the i-th virtual object and the encoded feature of the target virtual object is less than the distance threshold, the i-th virtual object is a non-associated virtual object of the target virtual object, and then the i-th virtual object is added to the selective attention set S. Thus, objects included in the selective attention set S may be determined.

5. For objects not included in the selective attention set S, set weight parameters of the objects as negative infinity, and reserve weight parameters of the objects included in the selective attention set S so as to obtain an updated weight feature w_logit'; and then perform normalization processing on the weight feature to obtain the normalized weight feature soft max (w_logit').

Determining the weight feature in the above manner is equivalent to applying an attention mechanism to process the encoded features of the plurality of virtual objects, which may take into account the influence of important virtual objects on the operation to be performed by the target virtual object, while weakening the influence of irrelevant virtual objects on the operation to be performed by the target virtual object. In this way, the determined operation is more accurate and more consistent with the current status of the virtual scene.

After the weight feature is determined, weighted fusion may be performed on the encoded features of the plurality of virtual objects based on the weight feature, so as to obtain the fused feature. In some embodiments, weighted summation is performed on the encoded features of the plurality of virtual objects based on the weight parameter of each virtual object in the weight feature, so as to obtain the fused feature. Alternatively, weighted averaging is performed on the encoded features of the plurality of virtual objects based on the weight parameter of each virtual object in the weight feature, so as to obtain the fused feature.

1204: Call, by the server, the operation prediction network to perform operation prediction on the fused feature so as to obtain operation information.

The operation information includes at least the sub-operations required to be performed by the artificial intelligence object, that is, a sub-operation to be performed by the artificial intelligence object is predicted. Moreover, the operation information may further include a duration for which the artificial intelligence object is expected to perform the sub-operation, or a prompt message to be displayed on the terminal to indicate that the artificial intelligence object is performing the sub-operation, or other information.

Since the fused feature may take into account the indication of the control instruction as well as the current status and influence degree of the plurality of virtual objects, the operation information predicted based on the fused feature is more accurate.

1205: Transmit, by the server, the operation information to the terminal.

1206: Receive, by the terminal, the operation information and control the artificial intelligence object to perform the sub-operation.

This embodiment of this application is illustrated merely with the process of controlling the artificial intelligence object once, and in fact, after the control instruction is received, the steps in this embodiment of this application may be performed repeatedly to repeatedly control the artificial intelligence object to perform the determined sub-operations.

Figure 13:
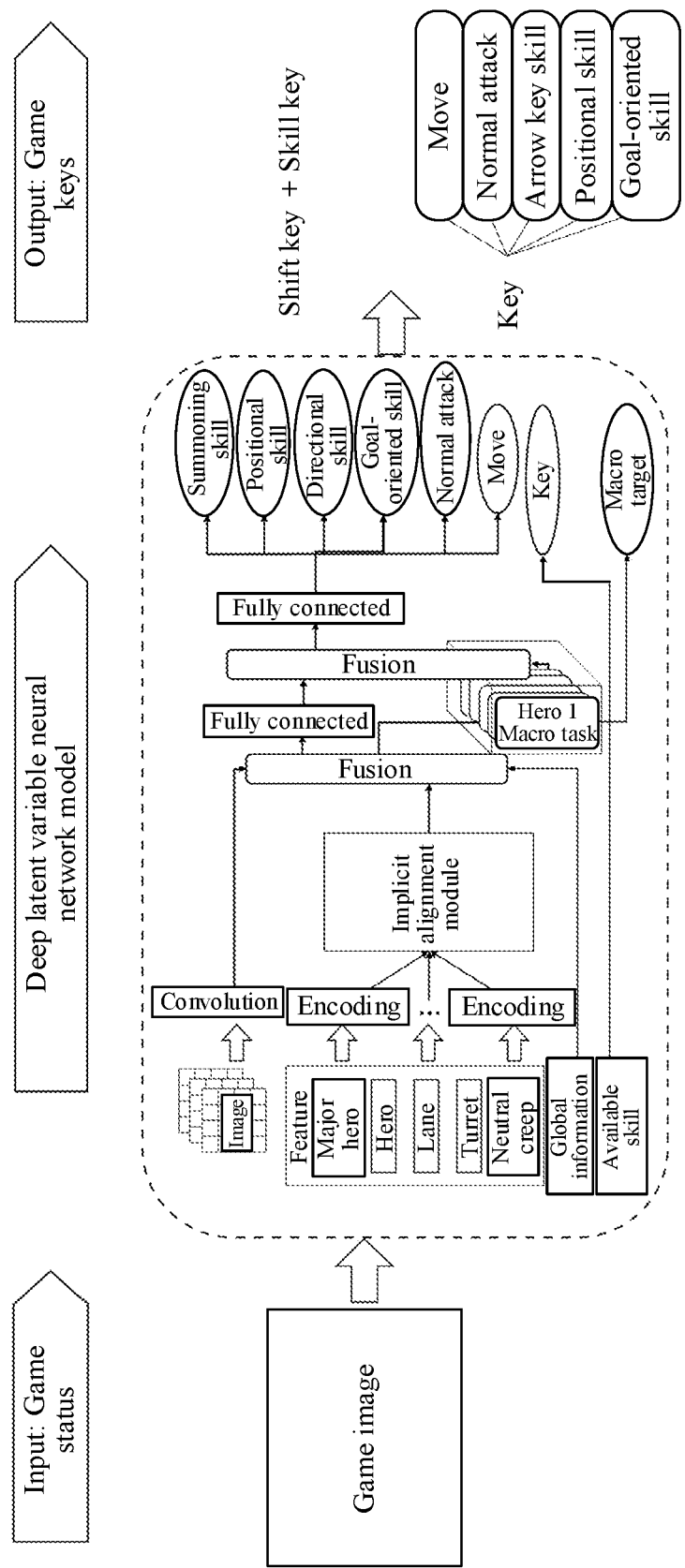
FIG. 13 is a schematic diagram of a deep latent variable neural network model according to an embodiment of this application.
Figure 14:
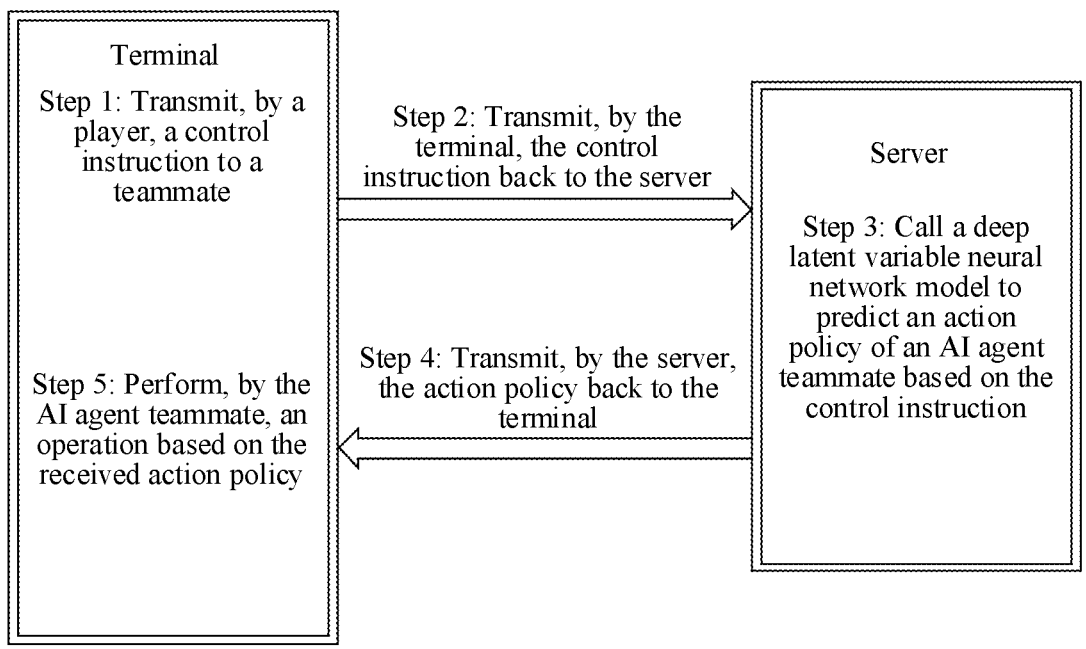
FIG. 14 is a schematic diagram of an interaction between a terminal and a server according to an embodiment of this application.

The process of controlling an AI agent in a game will be illustrated in conjunction with FIG. 13 and FIG. 14, where FIG. 13 provides a schematic diagram of a deep latent variable neural network model, and FIG. 14 provides a schematic diagram of an interaction between the terminal and the server.

As shown in FIG. 13 and FIG. 14, firstly, a player transmits the control instruction to a teammate, then the terminal where the player is located transmits the control instruction back to the server, and the server calls the deep latent variable neural network model to predict an action policy (i.e., the above-mentioned operation information) of the AI agent teammate of the player based on the control instruction. The server then transmits the action policy back to the terminal, and the AI agent teammate may perform a corresponding operation on the terminal based on the action policy.

Input of the deep latent variable neural network model is current game status data, including a game image displayed by the current terminal, status data of each virtual object, global information for representing a global status of a virtual scene, and available skills of the virtual object controlled by the terminal, etc. Each virtual object may include major heroes, other heroes, lanes, turrets, neutral creeps, etc. of the terminal.

The deep latent variable neural network model includes a convolution network, an encoding network, a fusion network, and an operation prediction network. The convolution network is used for performing convolution operation on the image to obtain an image feature. The encoding network is used for encoding the status data of each virtual object to obtain encoded features of a plurality of virtual objects. The fusion network may be seen as an implicit alignment module for performing weighted fusion on the encoded features of the plurality of virtual objects and then fusing a feature obtained by weighted fusion with the image feature to obtain a fused feature. For example, the feature obtained by weighted fusion is fused with the image feature through a Concat operator (an operator for linking and merging a plurality of character strings) to obtain the fused feature. The operation prediction network includes at least one fully connected layer and at least one fusion layer to enable full connection or fusion of input features.

The implicit alignment module has a weight feature which is a latent variable of the implicit alignment module. The weight feature includes weight parameters of the plurality of virtual objects for weighting the encoded features of the plurality of virtual objects. Essentially, the implicit alignment module is a linear weighted summation operator, and a weight vector is confined to a particular latent space. The mathematical expression for the implicit alignment operator is as follows:

$$f_{fusion} = \sum_{i=1}^{n} w_{unit_i} * f_{unit_i}.$$

$$w = [w_{unit_1}, \ldots, w_{unit_n}] \in \{v : v \in \Delta^{n-1}, \|v\|_0 \leq k\}$$

In the above operators, $f_{unit_i} \in R^d$ is an encoded feature of a virtual object, $f_{fusion} \in R^d$ is a fused feature vector, $w_{unit_i} \in R$ is the weight parameter of the i-th virtual object, $\Delta^{n-1} := \{p \in R^n | \Sigma_{i=1}^{n} p_i = 1, \forall p_i \geq 0\}$ is probability simplex, and $\|v\|_0$ is an $l_0$ norm of a vector, that is, the quantity of non-zero elements. The weight feature $w \in R^n$ is an implicit random variable, with a calculation formula as follows:

$$w = \text{softmax}\left(\frac{[FF^T]_1}{\sqrt{d}}\right), F = [f_{unit_1}, \ldots, f_{unit_n}] \in R^{n \times d},$$

where i and n are positive integers, n denotes the quantity of virtual objects, i is less than or equal to n, $1/\sqrt{d}$ is a zoom factor, and $[\bullet]_1$ denotes a first row vector of a matrix.

The weight feature is determined based on the control instruction transmitted by the player, and the specific determining manner is similar to the above operation flow of determining the weight feature and will thus not be repeated here.

The key to successful implicit alignment is: the weight feature $w \in R^n$ is a sparse vector that belongs to the probability simplex $\Delta^{n-1}$. The sparsity of the weight feature may be interpreted as making feature selection of the virtual objects, that is, only encoded features of virtual objects with weight parameters being not zero are retained to participate in the process of predicting an action policy, which is actually aligning the encoded features of the virtual objects with the predicted action policy, so that the weight feature $w \in R^n$ is also referred to as an implicit alignment variable. This implicit feature selection mechanism is consistent with the intuition of a human player to play a game, that is, a decision made by the player is determined only by a small number of virtual objects that are focused on, which is in fact a selective attention mechanism. If the predicted action policy needs to be changed, a weight feature is sampled from the probability simplex $\Delta^{n-1}$ based on the received control instruction for predicting a corresponding action policy.

Output of the operation prediction network is game keys including a shift key and a skill key. The shift key is used for instructing and controlling the AI agent teammate to move. The skill key is used for instructing and controlling the AI agent teammate to release a skill, such as a summoning skill, a positional skill, a directional skill, a goal-oriented skill, etc.

This embodiment of this application provides the deep latent variable neural network model for achieving human-AI collaboration in MOBA games, and the principle thereof is to control an action-controllable AI agent based on an implicit alignment method. Specifically, the predicted action policy is changed by changing the latent variable (the weight feature) in the neural network. In a game where a human player cooperates with an action-controllable AI agent teammate, the human player transmits a purposeful control instruction to the AI agent teammate, and the AI agent teammate executes the instruction to actively cooperate with an intention of the player, thereby enhancing the interest of the game and the experience of the player.

The process of calling the neural network model is described in the above-mentioned embodiment shown in FIG. 12, and the neural network model needs to be trained firstly in order to ensure the accuracy of the neural network model.

In one possible implementation, the training process of the neural network model includes: acquire sample data, the sample data including sample status data and sample operation information at any sample moment, the sample status data including status data of a plurality of virtual objects at the sample moment, the sample operation information including an operation to be performed by the artificial intelligence object at the sample moment; and train the neural network model based on the sample data. That is, the sample status data is processed based on the neural network model to obtain predicted operation information, the predicted operation information including an operation to be performed by the artificial intelligence object at the sample moment predicted by the neural network model; and the neural network model is trained based on the sample operation information and the predicted operation information, so as to improve the accuracy of the neural network model. After one or more training, a neural network model with accuracy meeting requirements may be obtained, and thus the trained neural network model is called to predict the operation to be performed by the artificial intelligence object.

The specific content of the sample status data is similar to the status data in step 1202 above, the specific content of the sample operation information and the predicted operation information is similar to the operation information in step 1204 above, and the specific process of obtaining the predicted operation information is similar to steps 1202-1204 above, which will thus not be repeated here.

In another possible implementation, the neural network model may also be trained by reinforcement learning. In the training process, if the artificial intelligence object responds to the control instruction successfully, a reward may be obtained, and the neural network model may learn the capacity to respond to the control instruction after one or more training, so that a more accurate neural network model is obtained.

Moreover, the artificial intelligence object may be controlled in other ways besides the neural network model. In one embodiment, the server is provided with a behavior tree model in which an operation rule of the artificial intelligence object is defined, so that when receiving the control instruction, the server controls the artificial intelligence object to perform the target operation as directed by the behavior tree model. For example, when the control instruction is the assembling instruction, the rule in the behavior tree model is: keeping moving towards an assembling target until reaching a position near the assembling target. Thus, as directed by the behavior tree model, the artificial intelligence model may be controlled to keep moving towards the assembling target until reaching the position near the assembling target.

Figure 15:
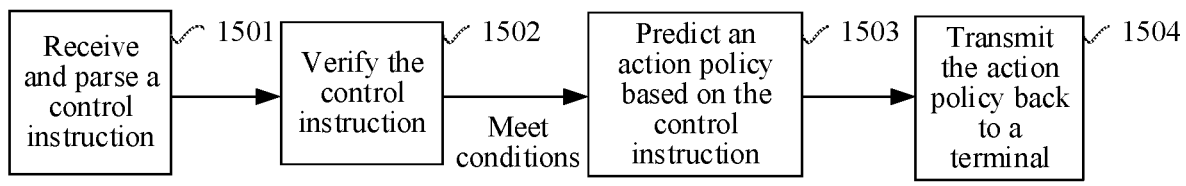
FIG. 15 is a flowchart of a method for verifying a control instruction according to an embodiment of this application.

On the basis of the above-mentioned embodiments, in order to facilitate determination of whether to control the artificial intelligence object to respond to the control instruction, an embodiment of this application further provides a method for verifying the control instruction. With the method, the control instruction may be verified firstly to determine whether to allow a response to the control instruction, and in the case of allowing a response to the control instruction, the artificial intelligence object is controlled based on the control instruction. As shown in FIG. 15, the method includes the following steps:

1501: Receive, by a server, a control instruction transmitted by a terminal, and parse the control instruction into a format supported by the server.

1502: Verify, by the server, the control instruction.

After the control instruction is parsed, the parsed control instruction is verified to determine whether to respond to the control instruction currently, so that reasonable control instructions are screened out, and unreasonable control instructions are screened away.

In some embodiments, the server predetermines a target rule, which may be determined manually. If the control instruction meets the target rule, the control instruction passes the verification, and step 1503 may be performed; and if the control instruction does not meet the target rule, the control instruction does not pass the verification, and step 1504 is not performed.

In some embodiments, an intention prediction model may also be called for verification to screen out control instructions that need a response and filter away control instructions that do not need a response. The intention prediction model is used for predicting, based on current status data, a first position that the artificial intelligence object may reach at the next moment in a virtual scene, so as to determine whether to respond to the control instruction based on the first position and a second position (where the artificial intelligence object needs to reach as directed) indicated by the control instruction.

In some embodiments, a map of the virtual scene is divided into a plurality of grids, for example, 12*12. The predicted position information of the artificial intelligence object is determined based on the current status data. The status data includes a current position of the artificial intelligence object. The predicted position information includes a probability corresponding to each grid in the map, and the probability represents a probability that the artificial intelligence object reaches the grid at the next moment. The greater the probability of the grid in the predicted position information, the more likely the artificial intelligence object may reach the grid at the next moment. Thus, a set is formed by first K grids with the highest probability in the predicted position information, and the set may represent K positions that the artificial intelligence object may reach most likely at the next moment, K being a positive integer.

The set is then compared with the second position indicated by the control instruction, and in the case that the second position belongs to the set, the control instruction passes the verification, indicating that a response to the control instruction is allowed. In the case that the second position does not belong to the set, the control instruction does not pass the verification, indicating that no response to the control instruction is allowed.

Figure 16:
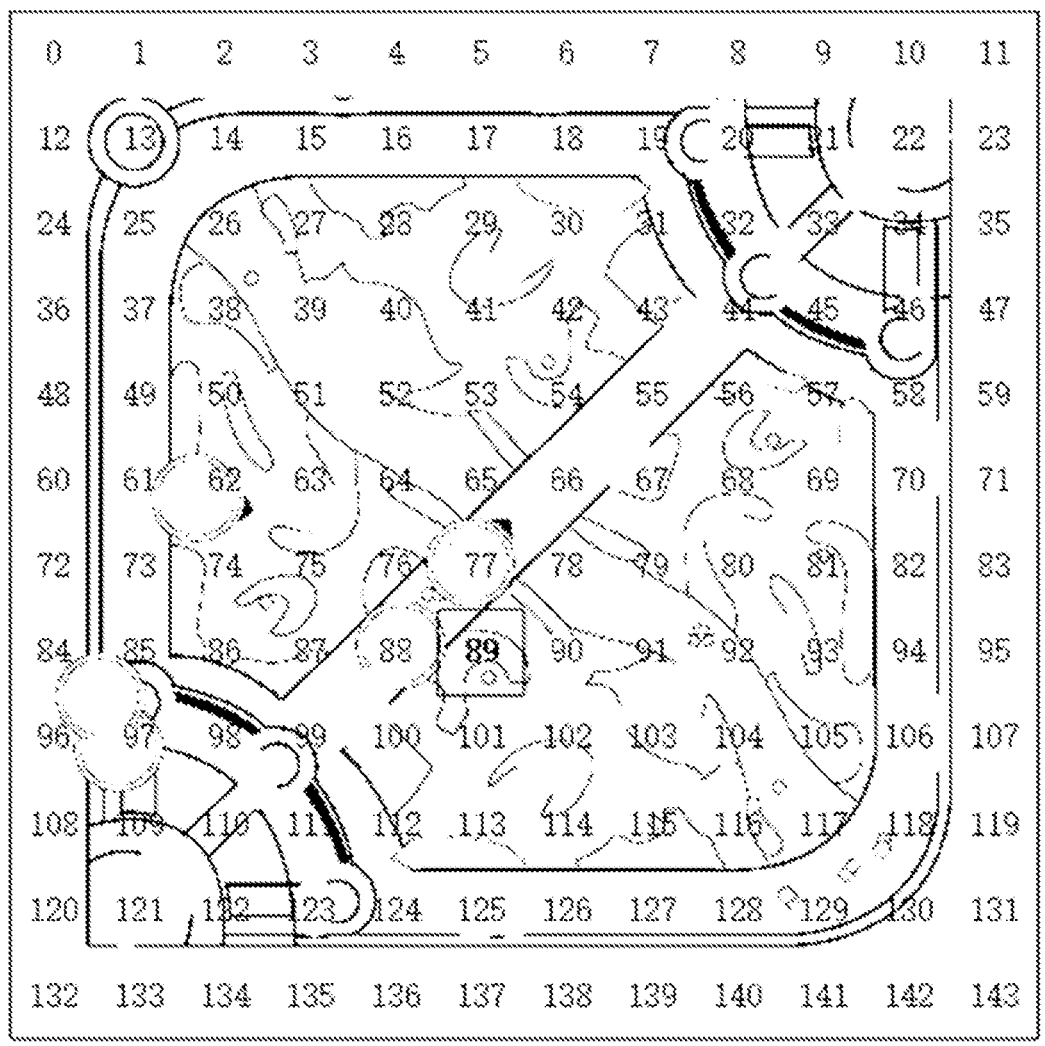
FIG. 16 is a schematic diagram of map grids according to an embodiment of this application.

For example, as shown in FIG. 16, each grid in the map is numbered in sequence, where the artificial intelligence object is currently in grid 121, and the target position that the artificial intelligence object is required to reach by the control instruction is in grid 89. If the set predicted by the intention prediction model is P={26, 27, 89, 116, 117}, including grid 89, the artificial intelligence object may execute the current control instruction to move to grid 89. If the set predicted by the intention prediction model is P={26, 27, 80, 116, 117}, not including grid 89, the current control instruction needs to be rejected for execution.

1503: Predict, in the case that the control instruction passes verification, the action policy of the artificial intelligence object based on the control instruction.

1504: Transmit, by the server, the action policy back to the terminal, so that the terminal receives the action policy transmitted back by the server and controls the artificial intelligence object based on the action policy.

In some embodiments, the intention prediction model includes an encoding network, a fusion network, and a position prediction network. The process of calling the intention prediction model to determine the predicted position information of the artificial intelligence object includes: call, by the server, the encoding network to encode the status data of the plurality of virtual objects so as to obtain the encoded features of the plurality of virtual objects; call the fusion network to perform weighted fusion on the encoded features of the plurality of virtual objects based on the weight feature so as to obtain the fused feature, the weight feature including weight parameters of the plurality of virtual objects in a virtual scene; and call, by the server, the position prediction network to perform position prediction on the fused feature so as to obtain predicted position information.

The process of calling the encoding network, the fusion network, and the position prediction network is similar to the process of steps 1202-1204 above. The difference is that in step 1203 above, the weight feature of the fusion network in the neural network model is determined based on the received control instruction, and the weight feature may change with different control instructions received. In this embodiment, after training of the intention prediction model is completed, the weight feature of the fusion network in the intention prediction model is unchanged.

The intention prediction model needs to be trained before being called to predict the intention of the control instruction. The process of training the intention prediction model includes: acquire sample data, the sample data including the status data of a plurality of virtual objects at a sample moment and a corresponding position tag, the status data including at least an image frame at the sample moment, the status data being similar to the status data in the above-mentioned embodiment, the position tag being a grid number of a target event, such as attack, assembling, retreat, etc. occurring at the next moment of the sample moment; and then train the intention prediction model based on the sample data so as to obtain a trained intention prediction model. The above events are defined as the following types: 1. An attack behavior occurs. 2. An assembling behavior occurs. 3. A retreat (from a hazard position to a safe location) behavior occurs. Of course, other types of events may be included. In addition, in order to ensure the accuracy of the training, the sample data may include status data and corresponding position tags at a plurality of sample moments, so that the intention prediction model is trained based on the status data and the position tags at consecutive moments.

In some embodiments, the intention prediction model may be trained based on data of the human player, that is, the sample data acquired in the process of training the intention prediction model belongs to the human player, that is, the sample data includes status data of the controlled virtual object of the human player and a corresponding position tag, which may ensure that the intention prediction model may learn events of the human player, so as to ensure that when the intention prediction model is called to predict the intention of the control instruction, the intention is consistent with the behavior of the human player.

Figure 17:
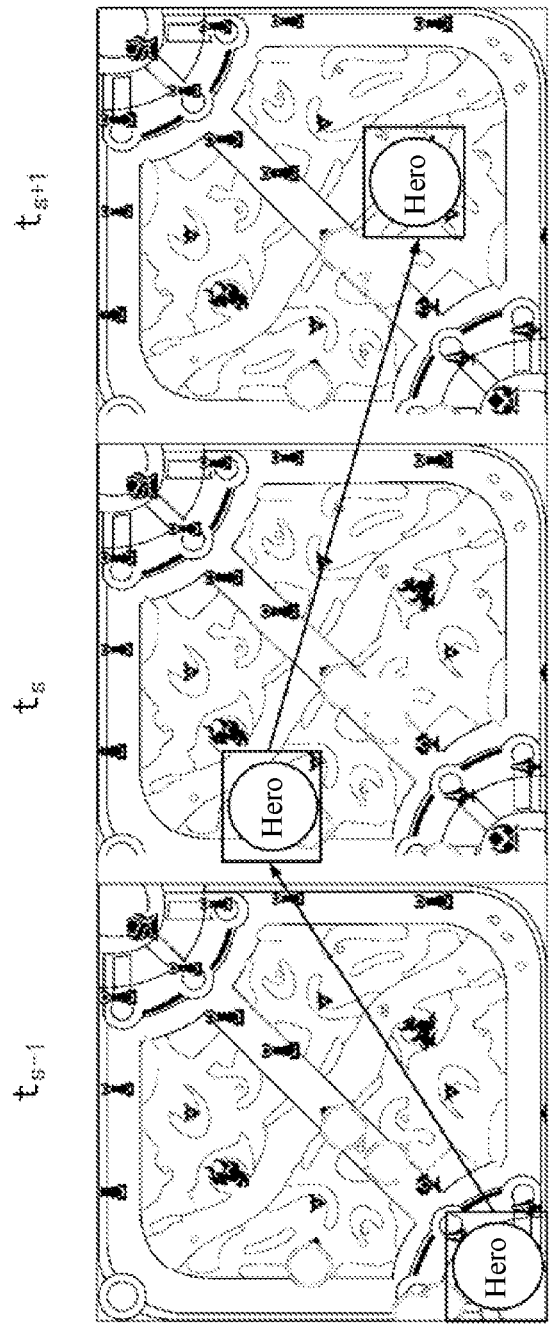
FIG. 17 is a schematic diagram of grids of a plurality of moments according to an embodiment of this application.

As shown in FIG. 17, a hero starts from a moment $t\_(s-1)$ and then makes the attack behavior at a moment $t\_s$, so a position tag of an image frame within a time period $[t\_(s-1), t\_s)$ is calibrated as a grid number of the moment $t\_s$. Similarly, the hero makes the retreat behavior at a moment $t\_(s+1)$, so a position tag of an image frame within a time period $[t\_s, t\_(s+1)]$ is calibrated as a grid number of the moment $t\_(s+1)$. Therefore, the sample data at each moment is obtained.

Figure 18:
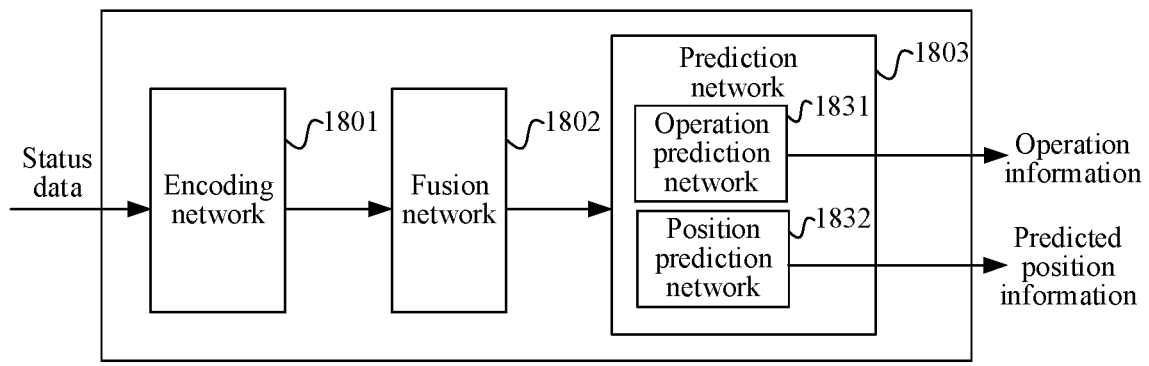
FIG. 18 is a schematic diagram of a prediction model according to an embodiment of this application.

By combining the above-mentioned neural network model and intention prediction model, an embodiment of this application further provides a method for training the neural network model and the intention prediction model at the same time. That is, as shown in FIG. 18, a server pre-creates a prediction model, the prediction model includes an encoding network 1801, a fusion network 1802, and a prediction network 1803, and the prediction network 1803 includes an operation prediction network 1831 and a position prediction network 1832. The operation prediction network 1831 is used for predicting operation information of an artificial intelligence object to determine an operation to be performed by the artificial intelligence object. The position prediction network 1832 is used for predicting predicted position information of the artificial intelligence object to determine a position that the artificial intelligence object may reach at the next moment.

In the training process of the prediction model, sample data and a position tag are acquired, where the sample data includes sample status data and sample operation information at any sample moment, the sample status data includes status data of a plurality of virtual objects at the sample moment, the sample operation information includes an operation to be performed by the artificial intelligence object at the sample moment, and the position tag is a grid number of an event, such as attack, assembling and retreat occurring at the next moment of the sample moment. The prediction model is then trained based on the sample data, that is, the sample status data is processed based on the prediction model to obtain predicted operation information and a predicted position information, the predicted operation information including an operation to be performed by the artificial intelligence object at the sample moment predicted by the prediction model, the predicted position information including a position that the artificial intelligence object may reach at the next moment; and then the prediction model is trained based on the sample operation information, the predicted operation information, the position tag and the predicted position information, so as to improve the accuracy of the prediction model. After one or more training, a prediction model with accuracy meeting requirements may be obtained, and thus the trained prediction model is called for prediction.

Figure 19:
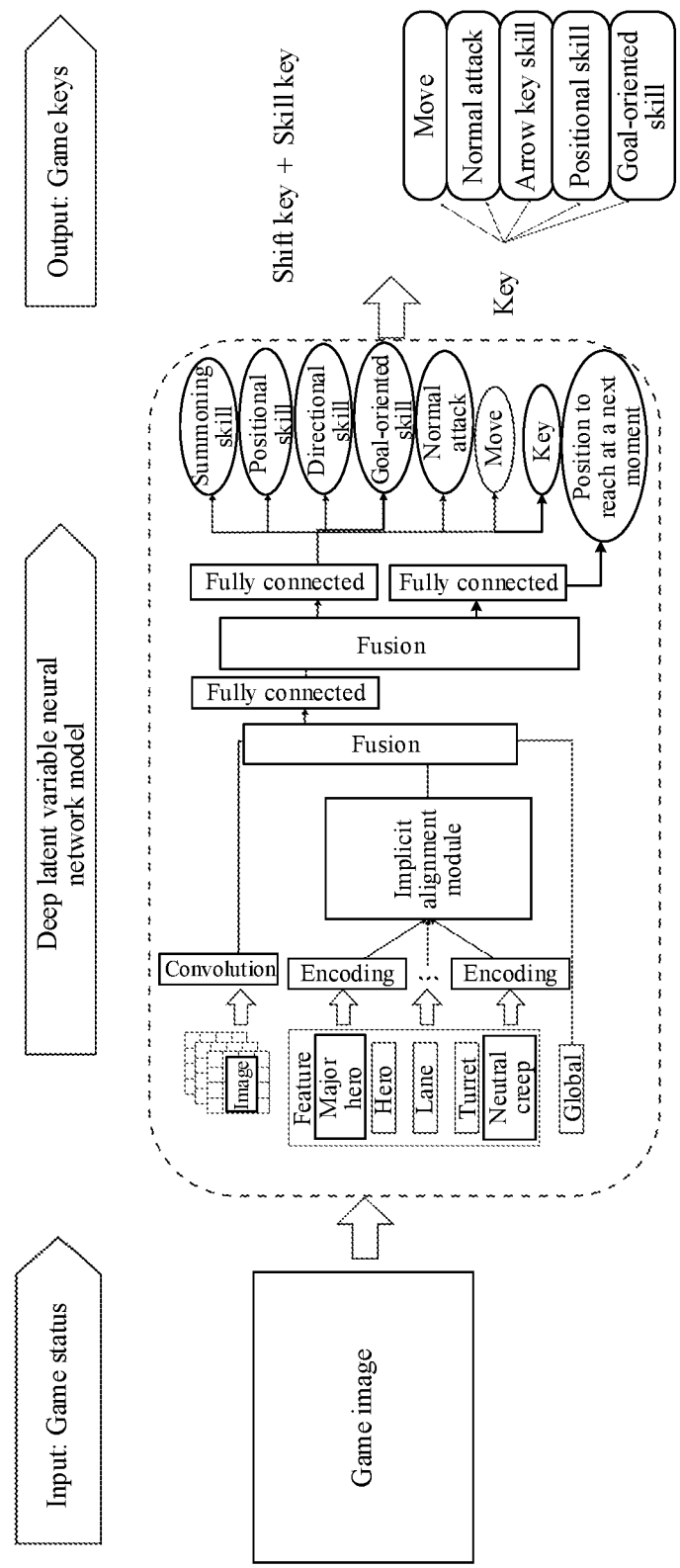
FIG. 19 is a schematic diagram of another deep latent variable neural network model according to an embodiment of this application.

For example, as may be seen from FIG. 13 and FIG. 19 that the deep latent variable neural network model shown in FIG. 19 is obtained by additionally providing another fully connected layer in the deep latent variable neural network model shown in FIG. 13 for predicting the position that the artificial intelligence object may reach at the next moment, it is sufficient to train the deep latent variable neural network model shown in FIG. 19.

Through the combined training method, the prediction model may be trained to have an operation prediction function and a position prediction function simultaneously, which increases the training speed and saves the training time.

Figure 20:
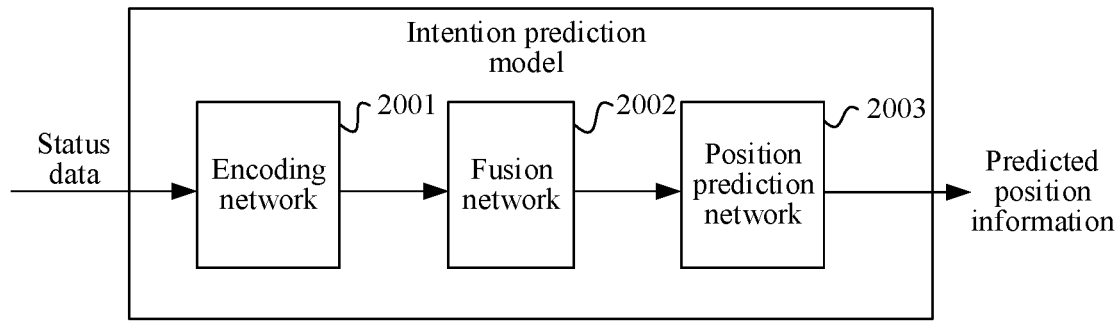
FIG. 20 is a schematic diagram of an intention prediction model according to an embodiment of this application.
Figure 21:
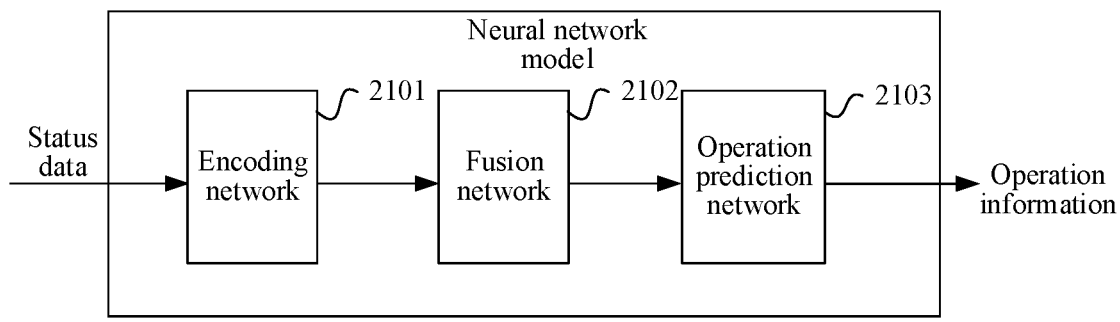
FIG. 21 is a schematic diagram of a neural network model according to an embodiment of this application.

In one possible implementation, after the training is completed, in order to achieve the operation prediction function and the position prediction function, respectively, an intention prediction model as shown in FIG. 20 and a neural network model as shown in FIG. 21 are constructed based on the trained network, respectively. The intention prediction model includes an encoding network 2001, a fusion network 2002, and a position prediction network 2003. The neural network model includes an encoding network 2101, a fusion network 2102, and an operation prediction network 2103. The encoding network 2001 and the encoding network 2101 are trained by the encoding network 1801 in FIG. 18. The fusion network 2002 and the fusion network 2102 are trained by the fusion network 1802 in FIG. 18. The position prediction network 2003 is trained by the position prediction network 1832 in FIG. 18. The operation prediction network 2103 is trained by the operation prediction network 1831 in FIG. 18.

Accordingly, after receiving the control instruction, the server first calls the intention prediction model to determine the predicted position information of the artificial intelligence object based on the status data of the plurality of virtual objects. The predicted position information includes a set of positions that the artificial intelligence object is likely to reach at the next moment. In the case that a position that the artificial intelligence object needs to reach as directed by the control instruction belongs to the set, the control instruction passes the verification. The server then determines a weight feature in the fusion network 2102 based on the control instruction, and then calls the neural network model to determine operation information of the artificial intelligence object.

In addition, although the encoded features of the plurality of virtual objects have been determined based on the status data of the plurality of virtual objects when the intention prediction model is called, the server may also re-determine the encoded features of the plurality of virtual objects based on the status data of the plurality of virtual objects to predict the operation information of the artificial intelligence object later when the neural network model is called. Furthermore, the server may change the status data of the plurality of virtual objects, for example, the control instruction includes a second object identifier of a target virtual object, and a target operation refers to an operation of moving towards the target virtual object, that is, the control instruction instructs the artificial intelligence object to reach a position where the target virtual object is located. However, if the target virtual object is not an attack object of the artificial intelligence object, the neural network model may not control the artificial intelligence object to move to the position where the target virtual object is located. Therefore, in order to cause the neural network model to control the artificial intelligence object to move to the position where the target virtual object is located, firstly, position information of the attack object of the artificial intelligence object in the status data of the plurality of virtual objects is changed to position information of the vicinity of the target virtual object, for example, coordinates of the attack object of the artificial intelligence object are changed to make a distance between the changed coordinates and coordinates of the target virtual object be less than a preset distance. In this way, the artificial intelligence object may mistakenly identify that the attack object is near the target virtual object, and thus may move towards the attack object, thereby achieving the effect of moving towards the target virtual object.

Figure 22:
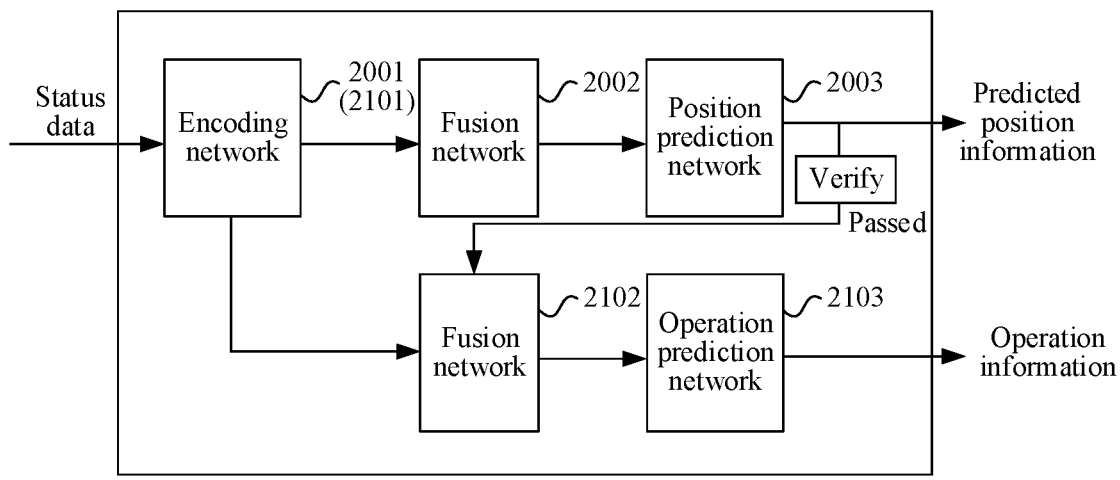
FIG. 22 is a schematic diagram of a shared encoding network according to an embodiment of this application.

In another possible implementation, in order to simplify the processing flow, the intention prediction model and the neural network model may share the same encoding network. As shown in FIG. 22, the encoding network 2001 and the encoding network 2101 are the same encoding network. The server calls the encoding network 2001 to determine the encoded features of the plurality of virtual objects based on the status data of the plurality of virtual objects, and then calls the fusion network 2002 and the position prediction network 2003 to determine the predicted position information of the artificial intelligence object. The predicted position information includes a set of positions that the artificial intelligence object is likely to reach at the next moment. In the case that a position that the artificial intelligence object needs to reach as directed by the control instruction belongs to the set, the control instruction passes the verification. The server then determines the weight feature in the fusion network 2102 based on the control instruction, and then calls the fusion network 2102 and the operation prediction network 2103 to predict the encoded feature obtained by the encoding network 2001 so as to determine the operation information of the artificial intelligence object.

Figure 23:
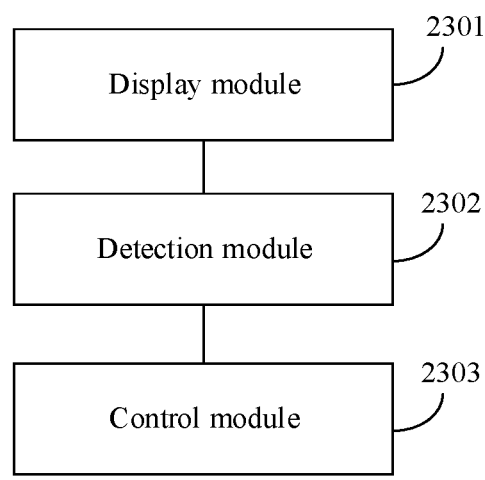
FIG. 23 is a schematic structural diagram of an artificial intelligence object control apparatus according to an embodiment of this application.

FIG. 23 is a schematic structural diagram of an artificial intelligence object control apparatus according to an embodiment of this application. Referring to FIG. 23, the apparatus includes:
- a display module 2301, configured to display a virtual scene interface, with a controlled virtual object of a terminal displayed in the virtual scene interface;
- a detection module 2302, configured to detect a control instruction via the virtual scene interface, the control instruction being used for instructing an artificial intelligence object in an ally camp of the controlled virtual object to perform a target operation; and
- a control module 2303, configured to control, based on the control instruction, the artificial intelligence object to perform the target operation.

Using the artificial intelligence object control apparatus according to this embodiment of this application, an interaction between human and the artificial intelligence object is achieved. The operation of the artificial intelligence object is controllable, and a user can control the artificial intelligence object belonging to the same camp as the controlled virtual object to perform the target operation only by transmitting the control instruction, achieving control over the artificial intelligence object. Therefore, collaboration between the human and the artificial intelligence object is achieved, and the function of the artificial intelligence object is extended.

In some embodiments, the detection module 2302 includes:
- a first detection unit, configured to detect an attack instruction via the virtual scene interface, the attack instruction being used for instructing the artificial intelligence object to attack a first target virtual object in a non-ally camp; or
- a second detection unit, configured to detect a retreat instruction via the virtual scene interface, the retreat instruction being used for instructing the artificial intelligence object to retreat to a safe position; or
- a third detection unit, configured to detect an assembling instruction via the virtual scene interface, the assembling instruction being used for instructing the artificial intelligence object to move towards a position of the controlled virtual object or a second target virtual object of the ally camp.

In some embodiments, the first detection unit is configured to:
- detect a trigger operation on an attack control via the virtual scene interface, and generate the attack instruction, the first target virtual object being a virtual object closest to the controlled virtual object in the non-ally camp; or
- detect an operation of dragging the attack control to an object identifier of the first target virtual object via the virtual scene interface, and generate the attack instruction; or
- detect a selection operation on the object identifier of the first target virtual object via the virtual scene interface, and generate the attack instruction.

In some embodiments, the second detection unit is configured to:
- detect a trigger operation on a retreat control via the virtual scene interface, and generate the retreat instruction, the retreat instruction being used for instructing the artificial intelligence object to retreat to the safe position; or
- detect an operation of dragging the retreat control to an object identifier of a third target virtual object of the ally camp via the virtual scene interface, and generate the retreat instruction, the retreat instruction being used for instructing the artificial intelligence object to retreat to a position of the third target virtual object; or
- detect a selection operation on the object identifier of the third target virtual object via the virtual scene interface, and generate the retreat instruction, the retreat instruction being used for instructing the artificial intelligence object to retreat to the position of the third target virtual object.

In some embodiments, the third detection unit is configured to:
- detect a trigger operation on an assembling control via the virtual scene interface, and generate the assembling instruction, the assembling instruction being used for instructing the artificial intelligence object to move towards the position of the controlled virtual object; or
- detect an operation of dragging the assembling control to an object identifier of the second target virtual object of the ally camp via the virtual scene interface, and generate the assembling instruction, the assembling instruction being used for instructing the artificial intelligence object to move towards the position of the second target virtual object; or detect a selection operation on the object identifier of the second target virtual object via the virtual scene interface, and generate the assembling instruction, the assembling instruction being used for instructing the artificial intelligence object to move towards the position of the second target virtual object.

In some embodiments, the control instruction carries an object identifier of a target virtual object, and the target operation refers to an operation of moving towards the target virtual object.

The control module 2303 includes:
a first control unit, configured to control, based on the control instruction, the artificial intelligence object to perform the operation of moving towards the target virtual object.

In some embodiments, the control module 2303 includes:
a second control unit, configured to transmit the control instruction to a server, call, by the server based on the control instruction, a neural network model to determine at least one sub-operation for completing the target operation, and control the artificial intelligence object to perform the at least one sub-operation.

All the above-mentioned technical solutions may be combined in any way to form the embodiments of this application, which are not repeated herein.

Figure 24:
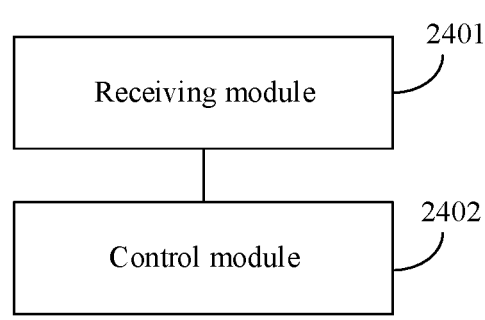
FIG. 24 is a schematic structural diagram of another artificial intelligence object control apparatus according to an embodiment of this application.

FIG. 24 is a schematic structural diagram of an artificial intelligence object control apparatus according to an embodiment of this application. Referring to FIG. 24, the apparatus includes:
a receiving module 2401, configured to receive a control instruction transmitted by a terminal, the control instruction being used for instructing an artificial intelligence object to perform a target operation; and
a control module 2402, configured to control, based on the control instruction, the artificial intelligence object to perform the target operation,
the artificial intelligence object belonging to an ally camp of a virtual object controlled by the terminal.

Using the artificial intelligence object control apparatus according to this embodiment of this application, an interaction between the terminal and the server is achieved, and the server can control the artificial intelligence object belonging to the same camp as the terminal to perform the corresponding target operation when receiving the control instruction, achieving control over the artificial intelligence object. Therefore, collaboration between human and the artificial intelligence object is achieved, and the function of the artificial intelligence object is extended.

In some embodiments, the control module 2402 includes:
a first control unit, configured to call, based on the control instruction, a neural network model to determine at least one sub-operation for completing the target operation, and control the artificial intelligence object to perform the at least one sub-operation.

In some embodiments, the neural network model includes an encoding network, a fusion network and an operation prediction network. The first control unit includes:
an encoding subunit, configured to call the encoding network to encode status data of a plurality of virtual objects so as to obtain encoded features of the plurality of virtual objects;
a fusion subunit, configured to call the fusion network to perform weighted fusion on the encoded features of the plurality of virtual objects based on a weight feature so as to obtain a fused feature, the weight feature including weight parameters of the plurality of virtual objects in a virtual scene, the weight feature being determined based on the control instruction;
a prediction subunit, configured to call the operation prediction network to perform operation prediction on the fused feature so as to obtain operation information, the operation information including at least the sub-operations required to be performed by the artificial intelligence object.

In some embodiments, the control instruction includes a first object identifier of the controlled virtual object and a second object identifier of the target virtual object, and the target operation refers to an operation of moving towards the target virtual object.

The first control unit further includes:
a determining subunit, configured to:
constitute an encoded matrix with the encoded features of the plurality of virtual objects;
determine a first weight feature based on a matrix obtained by multiplying the encoded matrix and a transpose matrix of the encoded matrix;
set a weight parameter of a non-associated virtual object in the first weight feature as negative infinity to obtain a second weight feature, a distance between the non-associated virtual object and the controlled virtual object and a distance between the non-associated virtual object and the target virtual object being not less than a distance threshold; and
perform normalization processing on the second weight feature, and determine the normalized weight feature as the weight feature in the fusion network.

In some embodiments, the control module 2402 includes:
a verification unit, configured to call an intention prediction model to verify the control instruction; and
a second control unit, configured to control, based on the control instruction, the artificial intelligence object to perform the target operation if the control instruction passes a verification.

All the above-mentioned technical solutions may be combined in any way to form the embodiments of this application, which are not repeated herein.

The artificial intelligence object control apparatus according to the above-mentioned embodiment is merely exemplified by the division of the above-mentioned various functional modules when controlling the artificial intelligence object to perform the target operation, and in practical applications, the above-mentioned functions may be completed by different functional modules according to needs, that is, the internal structure of the apparatus is divided into different functional modules to complete all or part of the functions described above. In addition, the artificial intelligence object control apparatus according to the above-mentioned embodiment belongs to the same concept as the artificial intelligence object control method embodiments, and the specific implementation process thereof is described in detail in the method embodiments, which will not be repeated herein.

Figure 25:
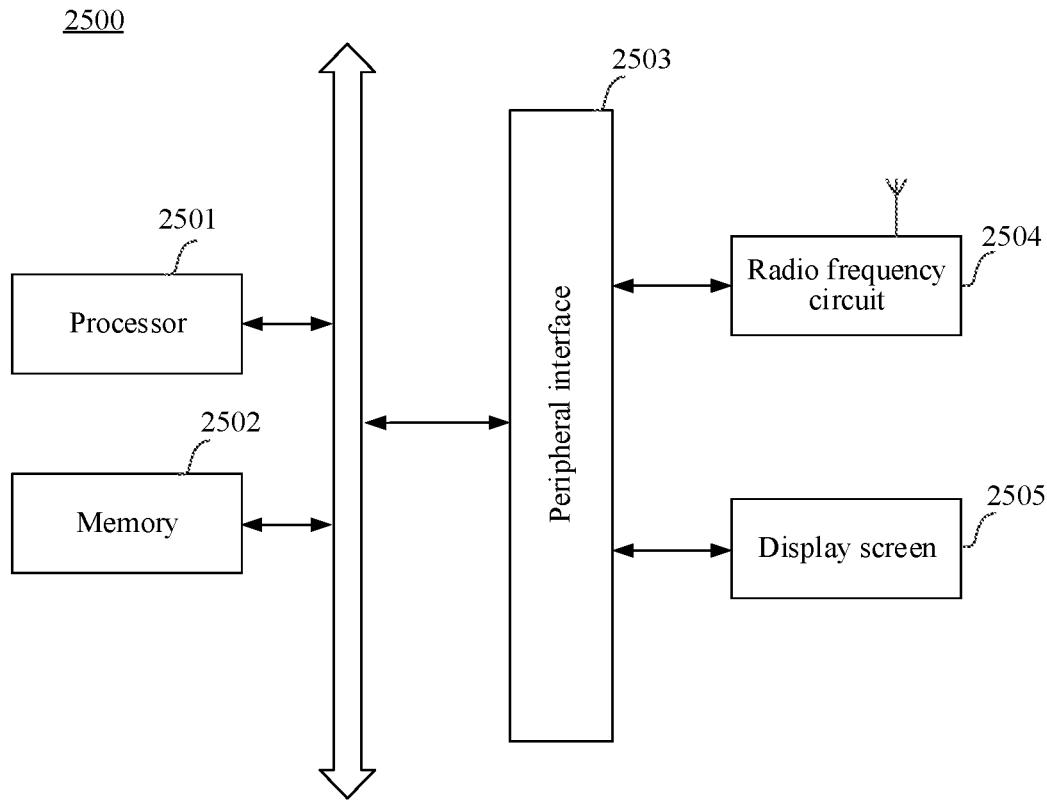
FIG. 25 is a schematic structural diagram of a terminal according to an embodiment of this application.

FIG. 25 illustrates a schematic structural diagram of a terminal 2500 according to an exemplary embodiment of this application. The terminal 2500 includes: a processor 2501 and a memory 2502.

The processor 2501 may include one or more processing cores, for example, a 4-core processor or an 8-core processor. The processor 2501 may be implemented in hardware in the form of at least one of digital signal processing (DSP), a field programmable gate array (FPGA) and a programmable logic array (PLA). In some embodiments, the processor 2501 may include an artificial intelligence (AI) processor for processing machine learning-related computing operations.

The memory 2502 may include one or more computer-readable storage media which may be non-transient. The memory 2502 may further include a high-speed random access memory, and a non-volatile memory such as one or more disk storage devices and flash storage devices. In some embodiments, the non-transitory computer-readable storage medium in the memory 2502 is used for storing at least one computer program, and the at least one computer program is executed by the processor 2501 to implement the artificial intelligence object control method according to the method embodiments in this application.

In some embodiments, the terminal 2500 may include: a peripheral interface 2503 and at least one peripheral. The processor 2501, the memory 2502, and the peripheral interface 2503 may be connected via bus or signal lines. Each peripheral may be connected to the peripheral interface 2503 via a bus, a signal line, or a circuit board. In some embodiments, the peripherals include: at least one of a radio frequency circuit 2504 or a display screen 2505. Other components may also be included.

The peripheral interface 2503 may be used for connecting the at least one peripheral related to input/output (I/O) to the processor 2501 and the memory 2502. In some embodiments, the processor 2501, the memory 2502, and the peripheral interface 2503 are integrated on the same chip or circuit board. In some other embodiments, any one or two of the processor 2501, the memory 2502, and the peripheral device interface 2503 may be implemented on a separate chip or circuit board, which is not limited in this embodiment.

The radio frequency circuit 2504 is used for receiving and transmitting a radio frequency (RF) signal, also referred to as an electromagnetic signal. The radio frequency circuit 2504 communicates with a communication network and other communication devices via the electromagnetic signal. The radio frequency circuit 2504 converts an electrical signal into an electromagnetic signal for transmission, or converts a received electromagnetic signal into an electrical signal. In some embodiments, the radio frequency circuit 2504 includes: an antenna system, an RF transceiver, one or more amplifiers, a tuner, an oscillator, a digital signal processor, a codec chipset, a subscriber identity module card, etc. The radio frequency circuit 2504 may communicate with other devices via at least one wireless communication protocol. The wireless communication protocols include, but are not limited to: metropolitan area networks, generations of mobile communication networks (2G, 3G, 4G and 5G), wireless local area networks and/or wireless fidelity (WiFi) networks. In some embodiments, the radio frequency circuit 2504 may further include a circuit related to near field communication (NFC), which is not limited in this application.

The display screen 2505 is configured to display a user interface (UI). The UI may include a graph, text, an icon, a video, and any combination thereof. When the display screen 2505 is a touch display screen, the display screen 2505 also has the capacity to collect a touch signal at or above a surface of the display screen 2505. The touch signal may be inputted to the processor 2501 as a control signal for processing. In this case, the display screen 2505 may also be used for providing virtual buttons and/or virtual keyboards, also referred to as soft buttons and/or soft keyboards.

A person skilled in the art will appreciate that the configuration shown in FIG. 25 is not to be construed as limiting the terminal 2500 and may include more or fewer components than illustrated, or some components may be combined, or a different arrangement of components may be employed.

Figure 26:
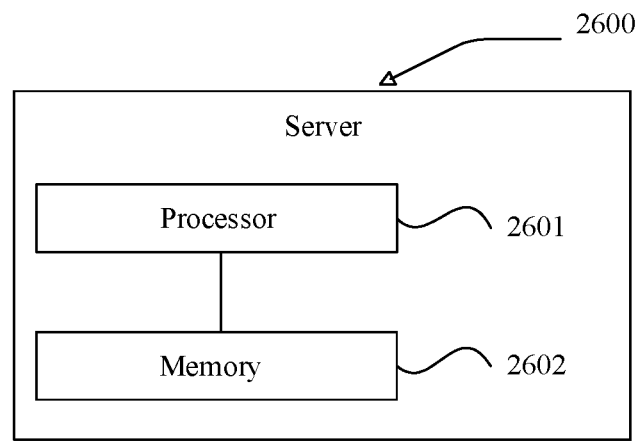
FIG. 26 is a schematic structural diagram of a server according to an embodiment of this application.

FIG. 26 is a schematic structural diagram of a server according to an embodiment of this application. The server 2600 may vary considerably by configuration or performance, and may include one or more central processing units (CPUs) 2601 and one or more memories 2602. The memory 2602 has at least one computer program stored therein. The at least one computer program is loaded and executed by the processor 2601 to implement the methods according to the above-mentioned method embodiments. Of course, the server may also have a wired or wireless network interface, a keyboard and an input/output interface, etc. to facilitate input and output. The server may further include other components for realizing the functions of the device, which will not be described in detail herein.

An embodiment of this application further provides a non-transitory computer-readable storage medium having at least one computer program stored therein. The at least one computer program is loaded and executed by a processor to perform the operations performed by the artificial intelligence object control method according to the above embodiment.

An embodiment of this application further provides a computer program product or computer program. The computer program product or computer program includes a computer program code stored in a non-transitory computer-readable storage medium. A processor of a computer device reads the computer program code from the computer-readable storage medium, and the processor executes the computer program code to cause the computer device to perform the operations performed by the artificial intelligence object control method according to the above embodiment. In some embodiments, the computer program according to the embodiments of this application may be deployed to be executed on one computer device, or on a plurality of computer devices located at one site, or on a plurality of computer devices distributed at a plurality of sites and interconnected via a communication network. The plurality of computer devices distributed at the plurality of sites and interconnected via the communication network may form a blockchain system.

A person of ordinary skill in the art may appreciate that all or part of the steps of implementing the above embodiments may be completed by hardware, or may be completed by instructing relevant hardware through a program. The program may be stored in a non-transitory computer-readable storage medium which may be a read only memory, a magnetic disk or a compact disk, etc.

The above are merely optional embodiments of the embodiments of this application and are not intended to limit the embodiments of this application. Any modification, equivalent replacement, improvement, etc. made within the spirit and principle of the embodiments of this application shall fall within the scope of protection of this application.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method of controlling an artificial intelligence object performed by a terminal and a sever that is communicatively connected to the terminal, the method comprising:
   displaying, by the terminal, a virtual scene interface, the virtual scene interface including a virtual object controlled by the terminal and an artificial intelligence object in an ally camp of the controlled virtual object;
   detecting, by the terminal, a control instruction from a user of the terminal via the virtual scene interface, the control instruction instructing the artificial intelligence object to perform a target operation;
   transmitting, by the terminal, the control instruction to the server:
   encoding, by the server, current status data of the artificial intelligence object through an encoding network to obtain encoded features of the artificial intelligence object;
   performing, by the server, weighted fusion on the encoded features of the artificial intelligence object through a fusion network based on the control instruction to obtain a fused feature;
   performing, by the server, operation prediction on the fused feature through an operation prediction network to predict operation information to be performed by the artificial intelligence object;
   transmitting, by the server, the predicted operation information back to the terminal; and
   controlling, by the terminal based on the control instruction, the artificial intelligence object to perform the target operation based on the predicted operation information in the virtual scene interface.

2. The method according to claim 1, wherein the detecting, by the terminal, the control instruction from the user of the terminal via the virtual scene interface comprises:
   detecting, by the terminal, an attack instruction via the virtual scene interface, the attack instruction instructing the artificial intelligence object to attack a first target virtual object in a non-ally camp;
   detecting, by the terminal, a retreat instruction via the virtual scene interface, the retreat instruction instructing the artificial intelligence object to retreat to a safe position; or
   detecting, by the terminal, an assembling instruction via the virtual scene interface, the assembling instruction instructing the artificial intelligence object to move towards a position of the controlled virtual object or a second target virtual object of the ally camp.

3. The method according to claim 2, wherein the detecting, by the terminal, an attack instruction via the virtual scene interface comprises:
   detecting, by the terminal, a trigger operation on an attack control via the virtual scene interface, and generating the attack instruction, the first target virtual object being a virtual object closest to the controlled virtual object in the non-ally camp;
   detecting, by the terminal, an operation of dragging the attack control to an object identifier of the first target virtual object via the virtual scene interface, and generating the attack instruction; or
   detecting, by the terminal, a selection operation on the object identifier of the first target virtual object via the virtual scene interface, and generating the attack instruction.

4. The method according to claim 2, wherein the detecting, by the terminal, a retreat instruction via the virtual scene interface comprises:
   detecting, by the terminal, a trigger operation on a retreat control via the virtual scene interface, and generating the retreat instruction, the retreat instruction being used for instructing the artificial intelligence object to retreat to the safe position;
   detecting, by the terminal, an operation of dragging the retreat control to an object identifier of a third target virtual object of the ally camp via the virtual scene interface, and generating the retreat instruction, the retreat instruction being used for instructing the artificial intelligent object to retreat to a position of the third target virtual object; or
   detecting, by the terminal, a selection operation on the object identifier of the third target virtual object via the virtual scene interface, and generating the retreat instruction, the retreat instruction being used for instructing the artificial intelligence object to retreat to the position of the third target virtual object.

5. The method according to claim 2, wherein the detecting, by the terminal, an assembling instruction via the virtual scene interface comprises:
   detecting, by the terminal, a trigger operation on an assembling control via the virtual scene interface, and generating the assembling instruction, the assembling instruction being used for instructing the artificial intelligence object to move towards the position of the controlled virtual object;
   detecting, by the terminal, an operation of dragging the assembling control to an object identifier of the second target virtual object of the ally camp via the virtual scene interface, and generating the assembling instruction, the assembling instruction being used for instructing the artificial intelligence object to move towards the position of the second target virtual object; or
   detecting, by the terminal, a selection operation on the object identifier of the second target virtual object via the virtual scene interface, and generating the assembling instruction, the assembling instruction being used for instructing the artificial intelligence object to move towards the position of the second target virtual object.

6. The method according to claim 1, wherein the control instruction carries an object identifier of a target virtual object, and the target operation refers to an operation of moving towards the target virtual object; and
   the controlling, by the terminal based on the control instruction, the artificial intelligence object to perform the target operation based on the predicted operation information in the virtual scene interface comprises:
   controlling, by the terminal based on the control instruction, the artificial intelligence object to move towards the target virtual object.

7. A computer game system including a terminal and a sever that is communicatively connected to the terminal, the terminal and the server each comprising a processor and a memory, the memory having at least one computer program stored therein, the at least one computer program being loaded and executed by the processor and causing the terminal and the server to implement a method of controlling an artificial intelligence object including:
   displaying, by the terminal, a virtual scene interface, the virtual scene interface including a virtual object controlled by the terminal and an artificial intelligence object in an ally camp of the controlled virtual object;

detecting, by the terminal, a control instruction from a user of the terminal via the virtual scene interface, the control instruction instructing the artificial intelligence object to perform a target operation;

transmitting, by the terminal, the control instruction to the server;

encoding, by the server, current status data of the artificial intelligence object through an encoding network to obtain encoded features of the artificial intelligence object;

performing, by the server, weighted fusion on the encoded features of the artificial intelligence object through a fusion network based on the control instruction to obtain a fused feature;

performing, by the server, operation prediction on the fused feature through an operation prediction network to predict operation information to be performed by the artificial intelligence object;

transmitting, by the server, the predicted operation information back to the terminal; and controlling, by the terminal based on the control instruction, the artificial intelligence object to perform the target operation based on the predicted operation information in the virtual scene interface.

8. The computer game system according to claim 7, wherein the detecting, by the terminal, the control instruction from the user of the terminal via the virtual scene interface comprises:

detecting, by the terminal, an attack instruction via the virtual scene interface, the attack instruction instructing the artificial intelligence object to attack a first target virtual object in a non-ally camp;

detecting, by the terminal, a retreat instruction via the virtual scene interface, the retreat instruction instructing the artificial intelligence object to retreat to a safe position; or detecting, by the terminal, an assembling instruction via the virtual scene interface, the assembling instruction instructing the artificial intelligence object to move towards a position of the controlled virtual object or a second target virtual object of the ally camp.

9. The computer game system according to claim 8, wherein the detecting, by the terminal, an attack instruction via the virtual scene interface comprises:

detecting, by the terminal, a trigger operation on an attack control via the virtual scene interface, and generating the attack instruction, the first target virtual object being a virtual object closest to the controlled virtual object in the non-ally camp;

detecting, by the terminal, an operation of dragging the attack control to an object identifier of the first target virtual object via the virtual scene interface, and generating the attack instruction; or detecting, by the terminal, a selection operation on the object identifier of the first target virtual object via the virtual scene interface, and generating the attack instruction.

10. The computer game system according to claim 9, wherein the detecting, by the terminal, a retreat instruction via the virtual scene interface comprises:

detecting, by the terminal, a trigger operation on a retreat control via the virtual scene interface, and generating the retreat instruction, the retreat instruction being used for instructing the artificial intelligence object to retreat to the safe position;

detecting, by the terminal, an operation of dragging the retreat control to an object identifier of a third target virtual object of the ally camp via the virtual scene interface, and generating the retreat instruction, the retreat instruction being used for instructing the artificial intelligent object to retreat to a position of the third target virtual object; or detecting, by the terminal, a selection operation on the object identifier of the third target virtual object via the virtual scene interface, and generating the retreat instruction, the retreat instruction being used for instructing the artificial intelligence object to retreat to the position of the third target virtual object.

11. The computer game system according to claim 8, wherein the detecting, by the terminal, an assembling instruction via the virtual scene interface comprises:

detecting, by the terminal, a trigger operation on an assembling control via the virtual scene interface, and generating the assembling instruction, the assembling instruction being used for instructing the artificial intelligence object to move towards the position of the controlled virtual object;

detecting, by the terminal, an operation of dragging the assembling control to an object identifier of the second target virtual object of the ally camp via the virtual scene interface, and generating the assembling instruction, the assembling instruction being used for instructing the artificial intelligence object to move towards the position of the second target virtual object; or detecting, by the terminal, a selection operation on the object identifier of the second target virtual object via the virtual scene interface, and generating the assembling instruction, the assembling instruction being used for instructing the artificial intelligence object to move towards the position of the second target virtual object.

12. The computer game system according to claim 7, wherein the control instruction carries an object identifier of a target virtual object, and the target operation refers to an operation of moving towards the target virtual object; and the controlling, by the terminal based on the control instruction, the artificial intelligence object to perform the target operation based on the predicted operation information in the virtual scene interface comprises:

controlling, by the terminal based on the control instruction, the artificial intelligence object to move towards the target virtual object.

13. A non-transitory computer-readable storage medium, having at least one computer program stored therein, the at least one computer program being loaded and executed by a computer game system including a terminal and a sever that is communicatively connected to the terminal and causing the terminal and the server to implement a method of controlling an artificial intelligence object including:

displaying, by the terminal, a virtual scene interface, the virtual scene interface including a virtual object controlled by the terminal and an artificial intelligence object in an ally camp of the controlled virtual object;

detecting, by the terminal, a control instruction from a user of the terminal via the virtual scene interface, the control instruction instructing the artificial intelligence object to perform a target operation;

transmitting, by the terminal, the control instruction to the server;

encoding, by the server, current status data of the artificial intelligence object through an encoding network to obtain encoded features of the artificial intelligence object;

performing, by the server, weighted fusion on the encoded features of the artificial intelligence object through a fusion network based on the control instruction to obtain a fused feature;

performing, by the server, operation prediction on the fused feature through an operation prediction network to predict operation information to be performed by the artificial intelligence object;

transmitting, by the server, the predicted operation information back to the terminal; and controlling, by the terminal based on the control instruction, the artificial intelligence object to perform the target operation based on the predicted operation information in the virtual scene interface.

14. The non-transitory computer-readable storage medium according to claim 13, wherein the detecting, by the terminal, the control instruction from the user of the terminal via the virtual scene interface comprises:

detecting, by the terminal, an attack instruction via the virtual scene interface, the attack instruction instructing the artificial intelligence object to attack a first target virtual object in a non-ally camp;

detecting, by the terminal, a retreat instruction via the virtual scene interface, the retreat instruction instructing the artificial intelligence object to retreat to a safe position; or detecting, by the terminal, an assembling instruction via the virtual scene interface, the assembling instruction instructing the artificial intelligence object to move towards a position of the controlled virtual object or a second target virtual object of the ally camp.

15. The non-transitory computer-readable storage medium according to claim 14, wherein the detecting, by the terminal, an attack instruction via the virtual scene interface comprises:

detecting, by the terminal, a trigger operation on an attack control via the virtual scene interface, and generating the attack instruction, the first target virtual object being a virtual object closest to the controlled virtual object in the non-ally camp;

detecting, by the terminal, an operation of dragging the attack control to an object identifier of the first target virtual object via the virtual scene interface, and generating the attack instruction; or detecting, by the terminal, a selection operation on the object identifier of the first target virtual object via the virtual scene interface, and generating the attack instruction.

16. The non-transitory computer-readable storage medium according to claim 14, wherein the detecting, by the terminal, a retreat instruction via the virtual scene interface comprises:

detecting, by the terminal, a trigger operation on a retreat control via the virtual scene interface, and generating the retreat instruction, the retreat instruction being used for instructing the artificial intelligence object to retreat to the safe position;

detecting, by the terminal, an operation of dragging the retreat control to an object identifier of a third target virtual object of the ally camp via the virtual scene interface, and generating the retreat instruction, the retreat instruction being used for instructing the artificial intelligent object to retreat to a position of the third target virtual object; or detecting, by the terminal, a selection operation on the object identifier of the third target virtual object via the virtual scene interface, and generating the retreat instruction, the retreat instruction being used for instructing the artificial intelligence object to retreat to the position of the third target virtual object.

17. The non-transitory computer-readable storage medium according to claim 14, wherein the detecting, by the terminal, an assembling instruction via the virtual scene interface comprises:

detecting, by the terminal, a trigger operation on an assembling control via the virtual scene interface, and generating the assembling instruction, the assembling instruction being used for instructing the artificial intelligence object to move towards the position of the controlled virtual object;

detecting, by the terminal, an operation of dragging the assembling control to an object identifier of the second target virtual object of the ally camp via the virtual scene interface, and generating the assembling instruction, the assembling instruction being used for instructing the artificial intelligence object to move towards the position of the second target virtual object; or detecting, by the terminal, a selection operation on the object identifier of the second target virtual object via the virtual scene interface, and generating the assembling instruction, the assembling instruction being used for instructing the artificial intelligence object to move towards the position of the second target virtual object.

18. The non-transitory computer-readable storage medium according to claim 13, wherein the control instruction carries an object identifier of a target virtual object, and the target operation refers to an operation of moving towards the target virtual object; and the controlling, by the terminal based on the control instruction, the artificial intelligence object to perform the target operation based on the predicted operation information in the virtual scene interface comprises:

controlling, by the terminal based on the control instruction, the artificial intelligence object to move towards the target virtual object.

* * * * *